United States Patent
You et al.

(10) Patent No.: US 9,607,169 B2
(45) Date of Patent: Mar. 28, 2017

(54) MOBILE TERMINAL AND METHOD FOR CONTROLLING THE SAME

(71) Applicant: LG ELECTRONICS INC., Seoul (KR)

(72) Inventors: Kyungjin You, Seoul (KR); Taeyoung Jeon, Seoul (KR); Jinhae Choi, Seoul (KR); Jonghoon Kim, Seoul (KR); Jeongeun Choi, Seoul (KR); Sujin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 43 days.

(21) Appl. No.: 14/532,255

(22) Filed: Nov. 4, 2014

(65) Prior Publication Data

US 2015/0254471 A1 Sep. 10, 2015

(30) Foreign Application Priority Data

Mar. 10, 2014 (KR) .................. 10-2014-0027996

(51) Int. Cl.
| | |
|---|---|
| *G06F 21/00* | (2013.01) |
| *G06F 21/62* | (2013.01) |
| *G06F 21/36* | (2013.01) |
| *G06F 21/32* | (2013.01) |
| *G06F 3/01* | (2006.01) |
| *G06F 3/0488* | (2013.01) |
| *G06K 9/00* | (2006.01) |

(52) U.S. Cl.
CPC .......... *G06F 21/6218* (2013.01); *G06F 3/016* (2013.01); *G06F 3/04883* (2013.01); *G06F 3/04886* (2013.01); *G06F 21/32* (2013.01); *G06F 21/36* (2013.01); *G06F 21/6209* (2013.01); *G06F 21/6245* (2013.01); *G06F 2203/04808* (2013.01); *G06K 9/00154* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0049534 | A1* | 2/2009 | Chung | G06K 7/10346 726/7 |
| 2011/0271332 | A1* | 11/2011 | Jones | H04L 9/3247 726/7 |
| 2013/0111600 | A1* | 5/2013 | Guenther | G06F 21/72 726/26 |
| 2014/0007002 | A1 | 1/2014 | Chang et al. | |
| 2014/0059669 | A1* | 2/2014 | Yuan | G06F 21/60 726/17 |

OTHER PUBLICATIONS

IBM, "File Security System by Hand-Writing Signature," IBM Technical Disclosure Bulletin, vol. 38, No. 01, Jan. 1995, pp. 587, XP 000498878.

* cited by examiner

*Primary Examiner* — Ghazal Shehni
(74) *Attorney, Agent, or Firm* — Birch, Stewart, Kolasch & Birch, LLP

(57) ABSTRACT

A mobile terminal including a wireless communication unit configured to provide wireless communication; a touch screen; and a controller configured to receive a user signature that identifies a user and has a predetermined trace on the touch screen, and enter a user-only accessible folder based on the received user signature.

19 Claims, 58 Drawing Sheets

(a)

(b)

(c)

<signature input by user>

<displayed contour>

MOBILE TERMINAL AND METHOD FOR CONTROLLING THE SAME

CROSS-REFERENCE TO RELATED APPLICATIONS

This application claims priority to Korean Patent Application No. 10-2014-0027996 filed on 10 Mar. 2014 in Korea, the entire contents of which is hereby incorporated by reference in its entirety.

BACKGROUND OF THE INVENTION

1. Field of the Invention

The present invention relates to a mobile terminal for protecting privacy when a user uses a mobile terminal, and a method for controlling the same.

2. Background of the Invention

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

SUMMARY OF THE INVENTION

Accordingly, one aspect of the present invention is to address related art problems with mobile terminals.

Another aspect of the present invention is to provide a mobile terminal for guaranteeing user privacy in a simpler manner through a unique user signature, and a method for controlling the same.

Another aspect of the present invention is to provide a mobile terminal allowing only a user to access a secret folder of the mobile terminal through a unique signature of the user, and a method for controlling the same.

In an aspect, a mobile terminal may include: a touch screen; and a controller configured to, when a user signature that identifies a user and has a predetermined trace with respect to the touch screen is received, enter a user-only accessible folder.

When the user signature is received when the mobile terminal is locked, the controller may release the locked state by the user signature and enter the folder.

When the locked state of the mobile terminal is set to be released through input of a predetermined pattern, the controller may receive a user signature before the predetermined pattern is initiated on the display unit.

Thus, the controller may access a secret folder of the user immediately when the locked state of the mobile terminal is released.

When a predetermined input is received, the controller may activate a particular area of the touch screen to receive a user signature.

The predetermined input may be a fixed menu area not allowing for changing of a page by a user's flicking input When a stroke input applied to at least a portion of a body of the mobile terminal is received, the predetermined input may activate an area for receiving a user signature through predetermined vibration generated by the stroke input.

The predetermined input may be a pinch-out input applied to the touch screen, and the controller may receive a user signature on a background screen of the touch screen initiated by the pinch-out input.

The predetermined input may include a touch input starting from a bezel and extending to the touch screen.

The predetermined input may include an input for selecting a particular menu to access the user-only accessible secret folder.

The predetermined input may include a touch input of dragging an indicator area of the touch screen downwards by a multi-touch, and the controller may provide an area for receiving a user signature to a status window slid by the drag input.

When power of the touch screen is temporarily turned off, the controller may enter the secret folder by differentiating a signature input pattern of the user.

A plurality of set screens may be provided as a result of entering the folder, and when a user signature is input by a stylus pen or a multi-touch input, the controller may differentiate a screen provided according to the result of entering the folder and display the same on the touch screen.

The input user signature may include at least one tag, and the controller may display at least one item filtered by the tag among at least one item included in the folder according to the user signature on the touch screen. Thus, content included in the secret folder may be conveniently filtered and provided.

Meanwhile, the controller may associate the foregoing user signature with a predetermined item to move the associated item to the secret folder immediately when the secret folder is entered.

The controller may display an identifier indicating a state of entering the folder in an indicator area of the touch screen.

When the user signature is received when the mobile terminal is paired with a wearable device worn by a user through the wireless communication unit, at least one personal information included in the wearable device may be received and displayed together on a screen which has entered the folder. Thus, the personal information collected through the wearable device may be easily kept in storage in a user secret folder of the mobile terminal.

In another aspect, a method for controlling a mobile terminal may include: registering a user signature that identifies a user and has a predetermined trace; activating an area for receiving the user signature and displaying the same on a touch screen; and when the user signature is received in the area, performing control to enter a user-only accessible folder.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE PREFERRED EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
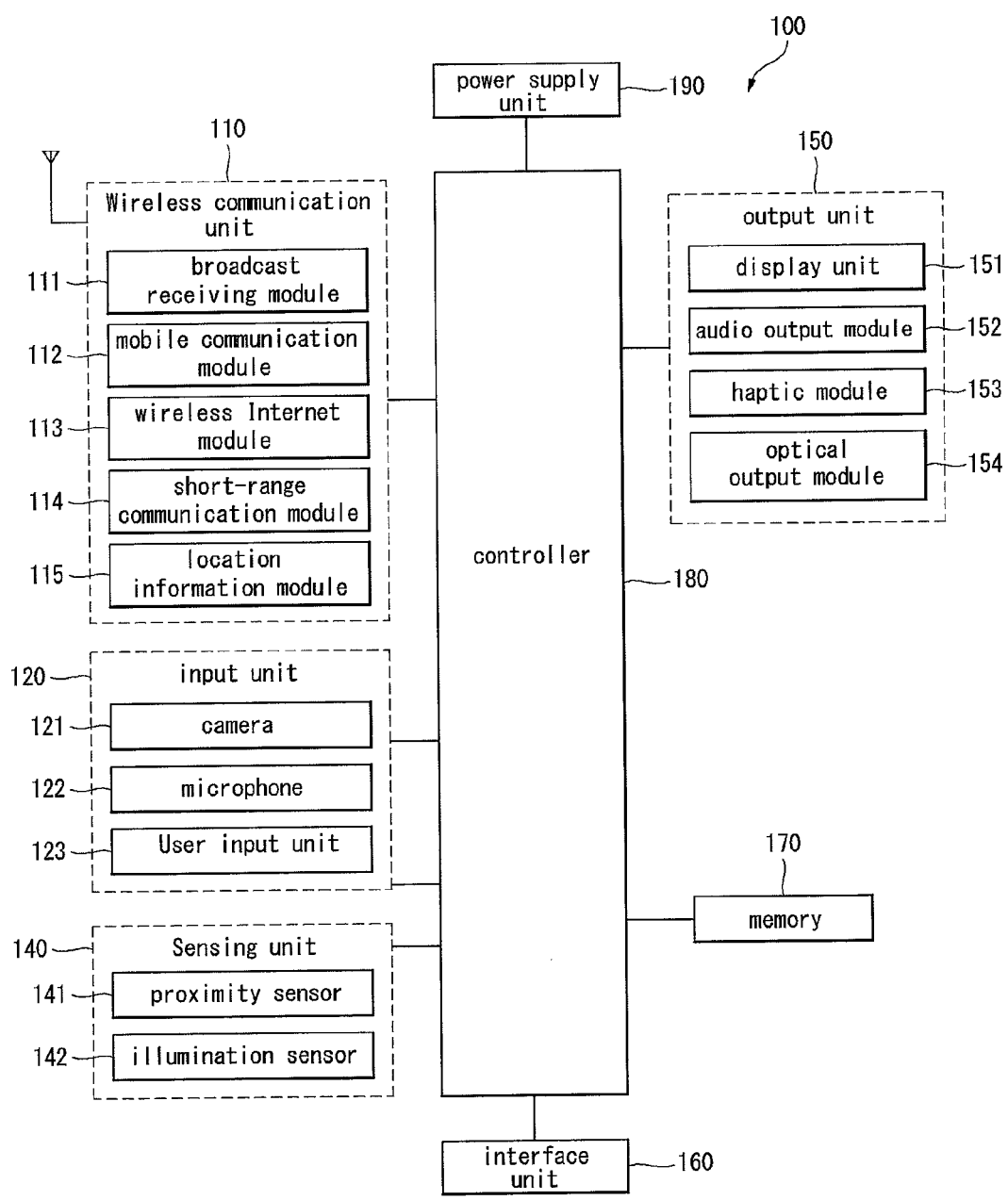
FIG. 1A is a block diagram of a mobile terminal according to an embodiment of the present invention.
Figure 1B:
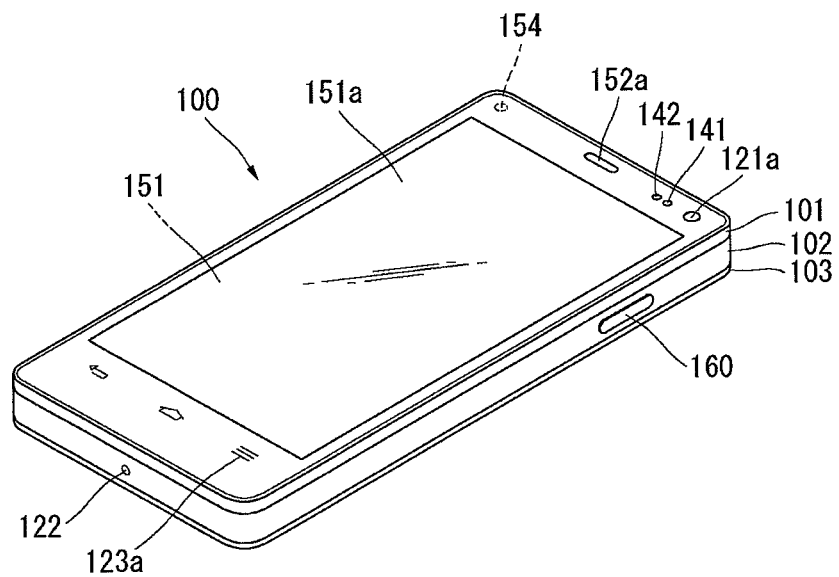
FIGS. 1B and 1C are conceptual views of one example of the mobile terminal, viewed from different directions.
Figure 1C:
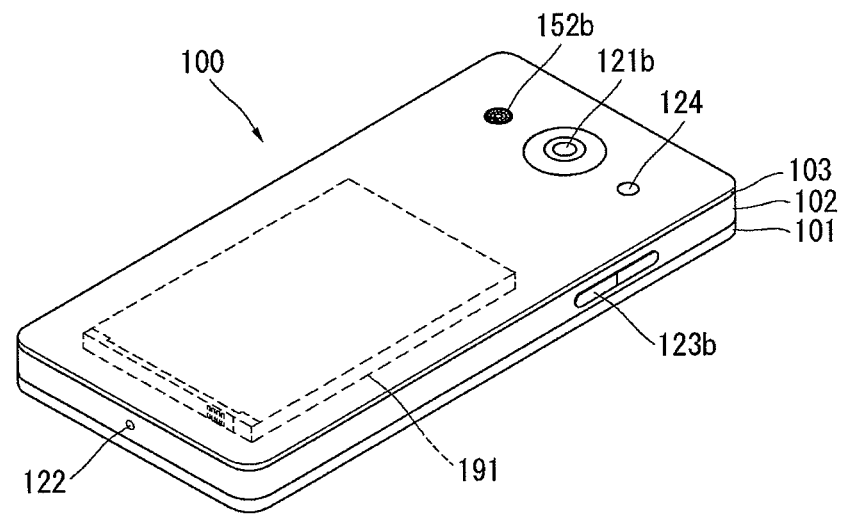

Reference is now made to FIGS. 1A-1C, where FIG. 1A is a block diagram of a mobile terminal in accordance with the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. All of the illustrated components is not a requirement, and that greater or fewer components may alternatively be implemented.

Referring now to FIG. 1A, the mobile terminal 100 is shown having wireless communication unit 110 configured with several implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). The application programs can be stored in the memory 170, installed in the mobile terminal 100, and executed by the controller 180 to perform an operation (or function) for the mobile terminal 100.

The controller 180 controls overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170. The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100).

The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114.

Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode.

The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others.

As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the present invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
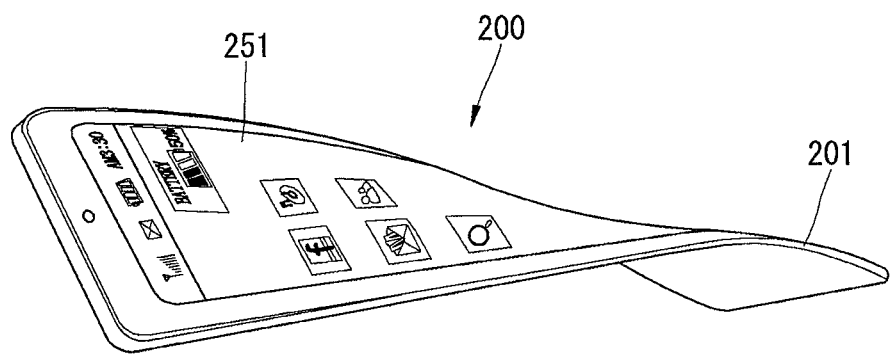
FIG. 2 is a conceptual view of a deformable mobile terminal according to an alternative embodiment of the present invention.

Next, FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof.

The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface.

As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, the controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 is not limited to deforming from an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example.

Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
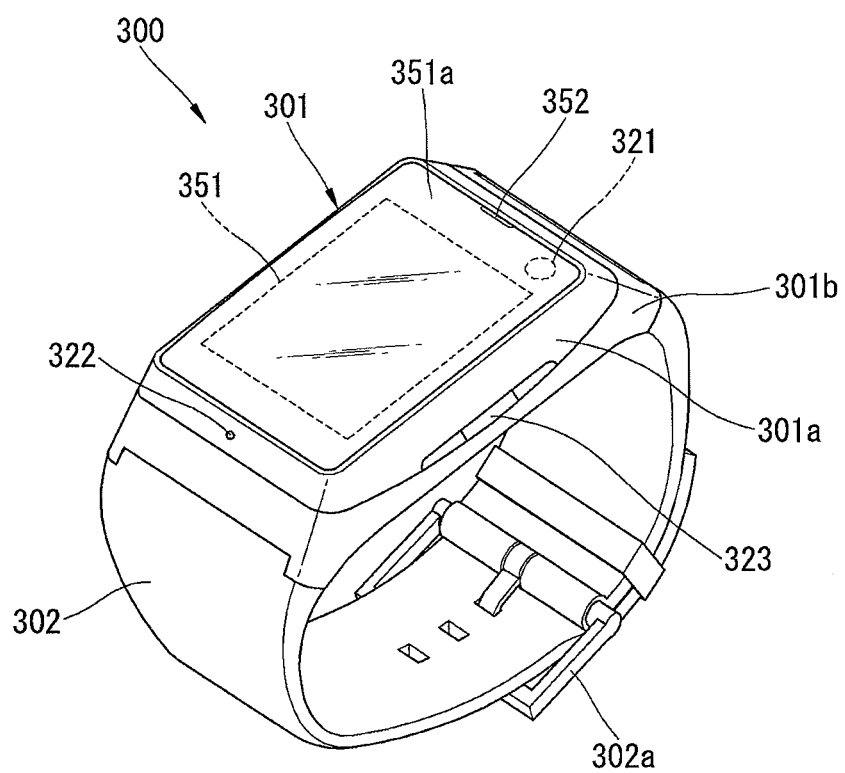
FIG. 3 is a conceptual view of a wearable mobile terminal according to another alternative embodiment of the present invention.

FIG. 3 is a perspective view illustrating one example of a watch-type mobile terminal 300 in accordance with another embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
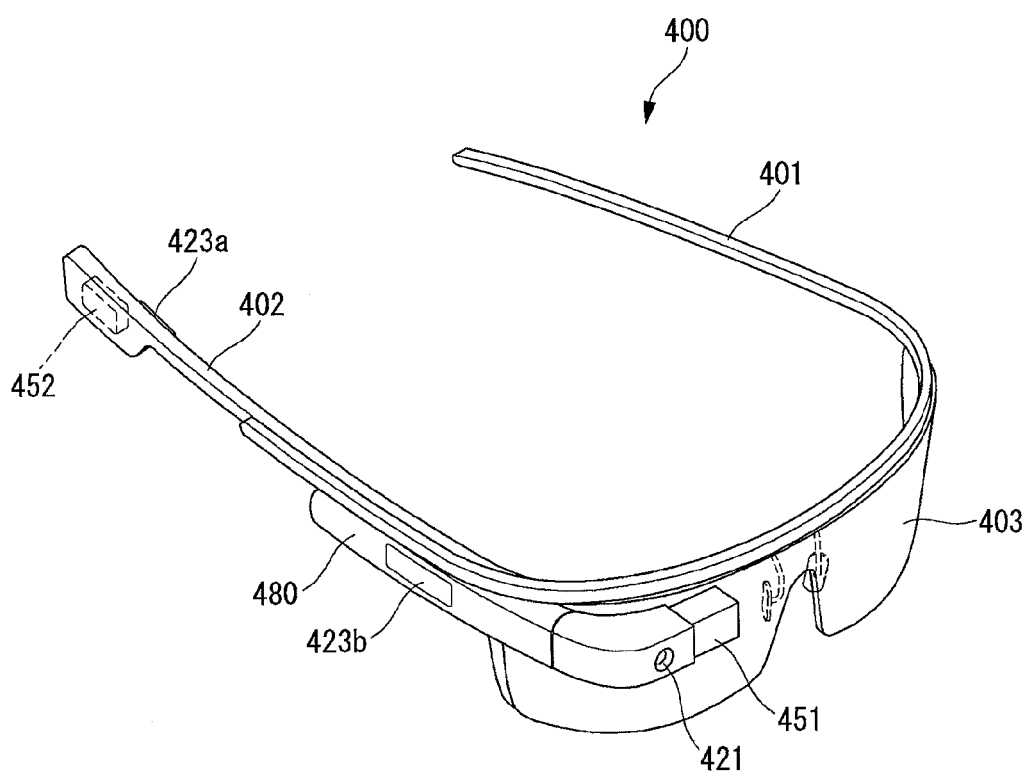
FIG. 4 is a conceptual view of a wearable mobile terminal according to another alternative embodiment of the present invention.

FIG. 4 is a perspective view illustrating one example of a glass-type mobile terminal 400 according to another embodiment. The glass-type mobile terminal 400 can be wearable on a head of a human body and provided with a frame (case, housing, etc.) The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Figure 5:
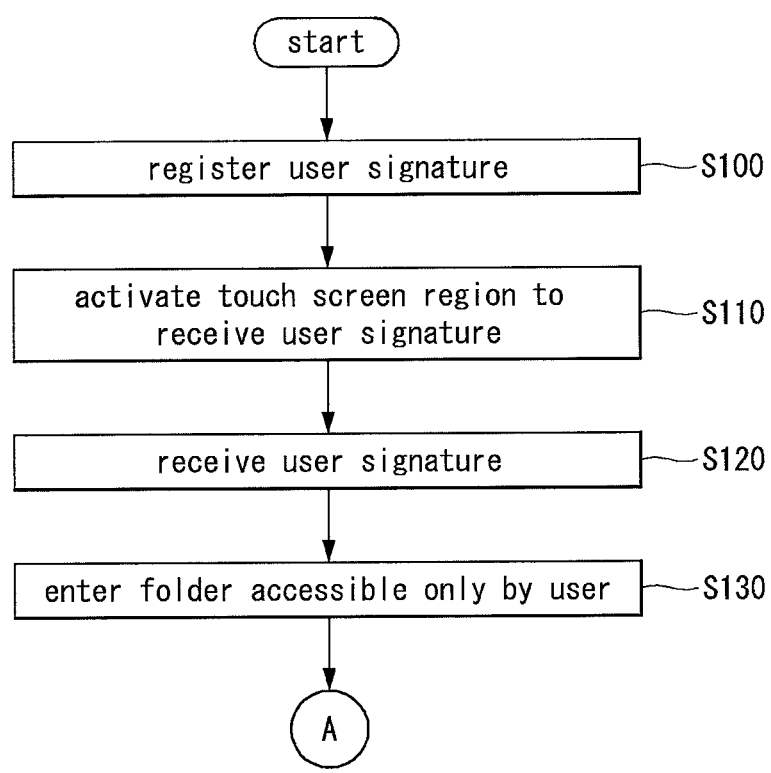
FIG. 5 is a flow chart illustrating a method for controlling a mobile terminal according to a first embodiment of the present invention.
Figure 6:
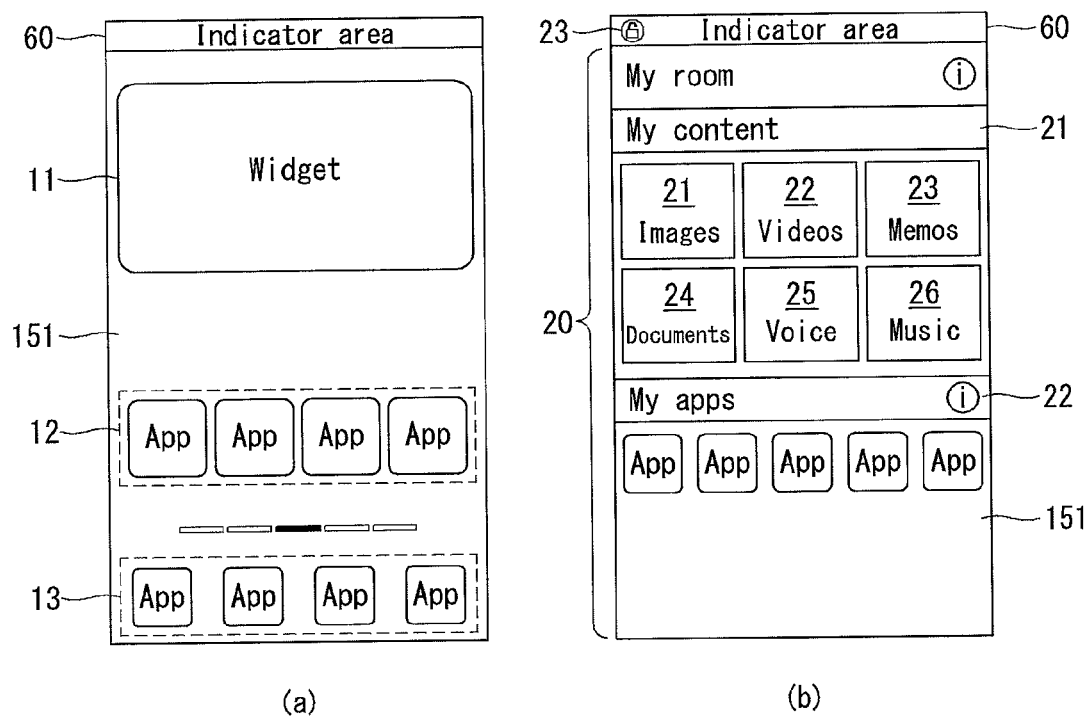
FIG. 6 includes views illustrating examples of secret folders accessible only by a user (or user-only accessible secret folders) according to the first embodiment of the present invention.

Next, FIG. 5 is a flow chart illustrating a method for controlling a mobile terminal according to a first embodiment of the present invention, and FIG. 6 includes views illustrating examples of secret folders accessible only by a user (or user-only accessible secret folders) according to the first embodiment of the present invention.

The method for controlling a mobile terminal according to an embodiment of the present invention may be implemented by the mobile terminal 100 described above with reference to FIGS. 1A, 1B, and 1C. Referring to FIG. 5, the controller 180 can register a user signature according to a user input (S100).

The user signature, which identifies a user and has a predetermined trace, may be input as a handwriting input or with a stylus pen. The controller 180 can store the registered user signature to the memory 170. Thereafter, when the user wants to access a folder accessible only by the user (or a user-only accessible folder) (hereinafter, referred to as a 'secret folder') afterwards, the user may access the folder by inputting the user signature.

Meanwhile, the user signature may be replaced by an input of predetermined codes in order, besides a signature based on a user's handwriting input. For example, when Arabic numerals "1, 2, 3, 4" may be combined in order and set (for example, 1324), a certain region of the touch screen 151 is divided into four virtual regions, and the set 1324 is sequentially touched with respect to the four virtual regions, the user may enter the secret folder.

The controller 180 can activate a touch screen region for receiving a user signature (S110). In order to receive a user signature to allow the user to enter the secret folder, a mode for receiving the user signature may be entered. When a predetermined input is received, the controller 180 can activate the region for receiving the user signature (S110).

The mobile terminal 100 may be in a lock mode or in an unlock mode. The lock mode may be divided into two modes. Namely, the mobile terminal 100 may be in a first lock mode in which power supply to the display unit 151 is cut off and no information is provided through the touch screen 151, and a second lock mode in which power is supplied to the touch screen 151, predetermined information may be provided through the touch screen 151, and a locked state may be released based on a manipulation of the touch screen 151 or any other predetermined manipulation.

Alternatively, the mobile terminal 100 may be in the unlock mode in which the lock mode is released and the mobile terminal 100 may be normally used. When a predetermined input is received in the lock mode or in the unlock mode, the mobile terminal 100 according to the embodiment of the present invention may activate a predetermined region for receiving the foregoing user signature to receive a user signature.

After the region for receiving the user signature is activated, the controller 180 can receive a user signature (S120). The controller 180 can determine whether the input user signature is identical to the previously registered user signature, and when the input user signature is identical to the previously registered user signature, the controller 180 can provide control to allow the user to enter the user-only accessible folder (secret folder) (S130).

Here, when the input user signature is not identical to the previously registered user signature but it has a trace similar to that of the previously registered user signature and a degree of difference is lower than a predetermined threshold value, the controller 180 can recognize the input user signature as the same user signature and allow the user to enter the secret folder.

When a difference between the input user signature and the previously registered user signature is greater than the threshold value, the controller 180 can request re-input of the user signature through predetermined feedback. The feedback may be variously provided through alarm, vibrations, a pop-up window, or the like.

Hereinafter, a screen corresponding to the secret folder will be described with reference to FIG. 6. In particular, FIG. 6(*a*) is a home screen provided through the touch screen 151 when the mobile terminal 100 is normally used. The home screen may include various application icons 12 and 13 including a widget 11.

In the home screen, the icons 12 of a first group may be a region that may be replaced by a next page as pages are changed according to a user flicking input, and the icons 13 of a second group may be a region in which the display may be maintained therein regardless of a user flicking input. Namely, the icons 13 of the second group may include a call icon, a text message icon, an icon for accessing the Internet, and the like, which are most frequently used according to a user setting.

Accordingly, the home screen may be divided into the first region 12 in which the icons of the first group are disposed and the second region 13 in which the icons of the second group are disposed. Meanwhile, other regions, excluding the first and second regions 12 and 13, may be regions in which the widget 11 is disposed or may be an empty space in which no icon is disposed.

FIG. 6(*b*) is a screen corresponding to the secret folder entered through input of a user signature as described above. The secret folder may be called "My room" and include user-only accessible content 21, application 22, and the like. The content and the application 22 may be items kept in storage in the secret folder through user manipulation.

Meanwhile, the controller 180 can display an identifier 23 indicating that the secret folder has been entered, on the touch screen 151. The identifier 23 may be displayed as an icon in an indicator area 60. Also, the identifier may be displayed in the form of unique text (for example, "My room" or "Owner mode".

The method of indicating that the secret folder has been entered through input of a user signature is not limited to the foregoing example and may be variously modified. As a way for feeding back the entry into the secret folder may include a visual effect, an auditory effect, vibration generation, and the like. For example, when the secret folder is entered through input of a user signature, the controller 180 can display the indicator area 60 such that it is visually discriminated from that before the secret folder was entered. For example, the controller 180 can change a color of the indicator area 60 to display the indicator area 60.

Figure 7:
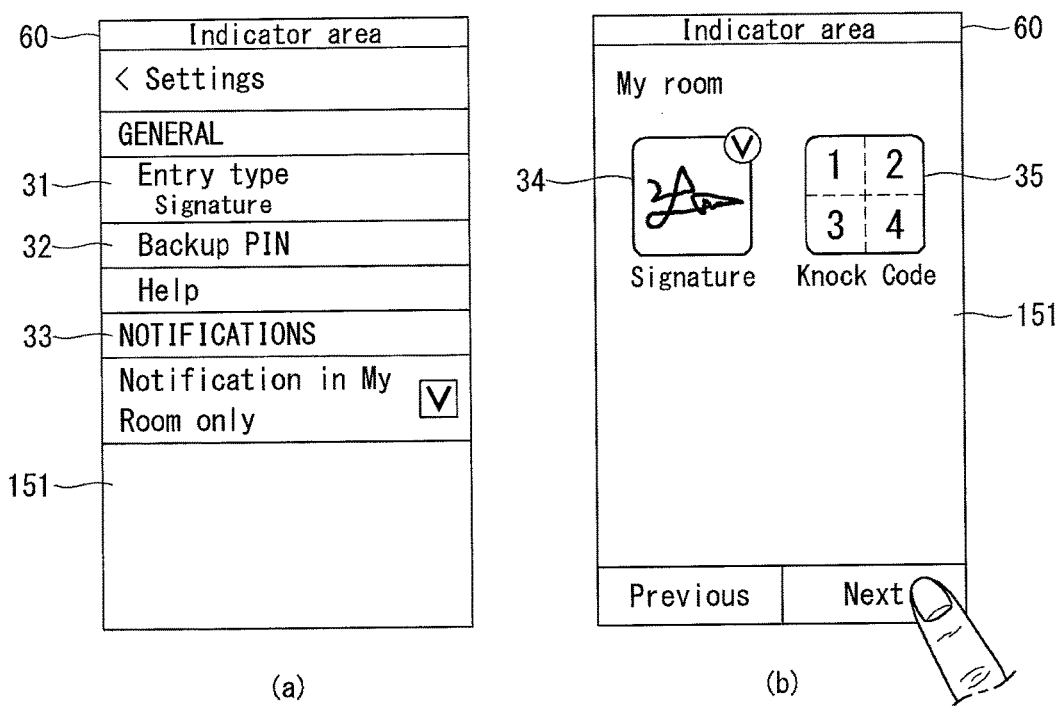
FIGS. 7 through 9 are views illustrating a process of registering a user signature according to the first embodiment of the present invention.
Figure 8:
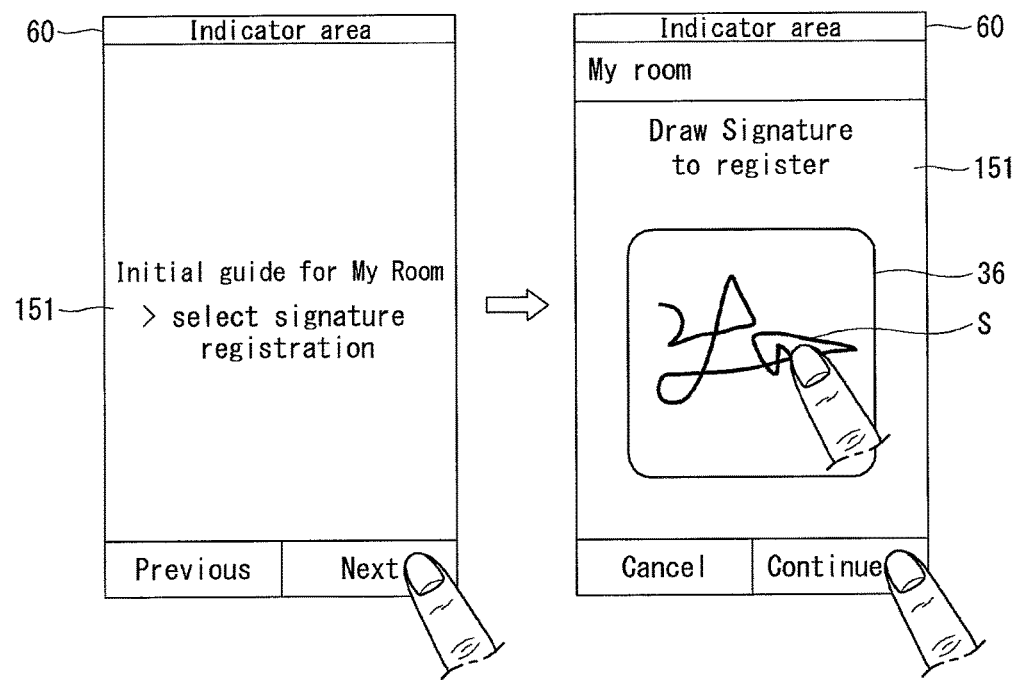
Figure 9:
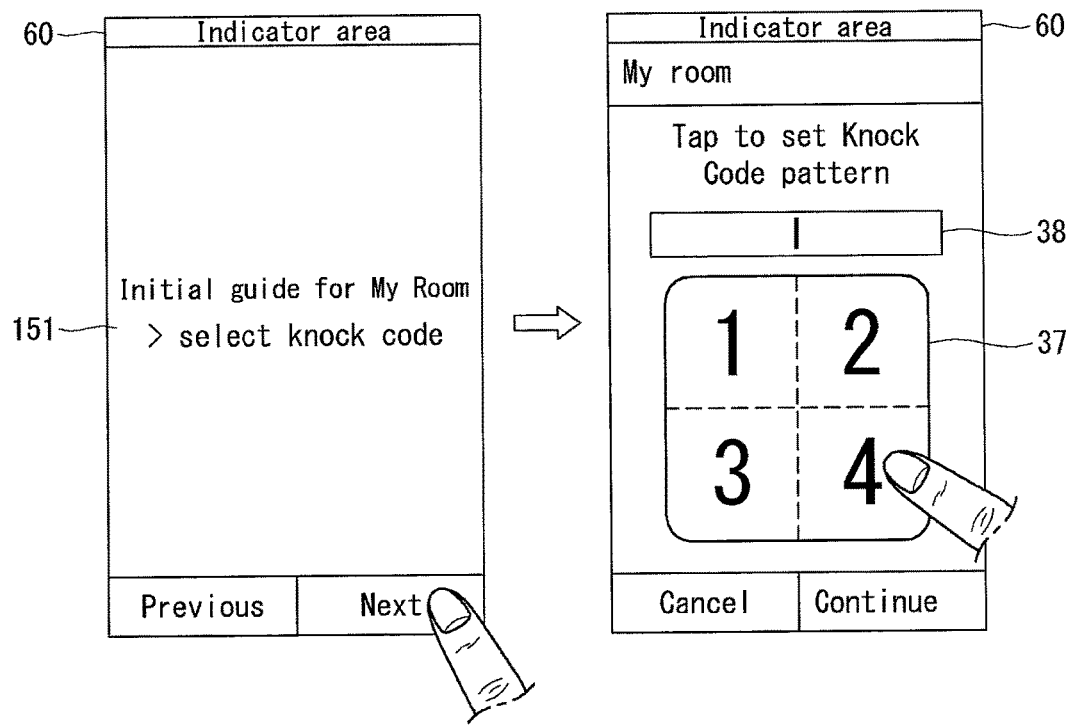

Hereinafter, operation S100 of FIG. 5 will be described in detail with reference to relevant drawings. FIGS. 7 through 9 are views illustrating a process of registering a user signature according to the first embodiment of the present invention.

Referring to FIG. 7, the controller 180 can provide setting screens (FIGS. 7(*a*) and 7(*b*)) for registering a user signature. The setting screen of FIG. 7(*a*) may include a signature type menu 31 for selecting whether a user signature is to be set by a signature that has a predetermined trace and identifies a user or whether the user signature is to be set with the foregoing certain codes, a back PIN menu 32 allowing for accessing the secret folder through a predetermined password When a set user signature is forgotten, a notification menu 33 for selecting whether a notification with respect to at least one application existing in the secret folder is to be received only when the secret folder is entered or whether the notification is to be received even when the secret folder is not entered, and the like.

In FIG. 7(b), when the signature type menu 31 is selected, a signature type is allowed to be selected by selecting any one of a signature item 34 that has a predetermined trace and identifies a user and a code item 35 to enter the secret folder.

When the signature item 34 is selected, as illustrated in FIG. 8, the controller 180 can display guide screens for registering a user signature on the touch screen 151. The guide screens may include a region 36 for receiving a user signature, and when a signature S is received in the region 36 through a user input, the signature S for entering the secret folder may be set.

Meanwhile, when the code menu 35 included in the signature type menu 31 is selected in FIG. 7(b), the space may be divided into quadrants, and when four Arabic numerals 37 allocated to the spaces divided into quadrants are input to an input column 38 according to predetermined order, a code for accessing the secret folder may be set, as illustrated in FIG. 9.

So far, the process of setting a user signature to enter the user-only accessible secret folder has been described. Hereinafter, various examples of entering the secret folder through input of the set user signature will be described in detail.

Next, FIGS. 10 through 20 are views illustrating examples of activating a region for inputting a user signature according to the first embodiment of the present invention.

Figure 10:
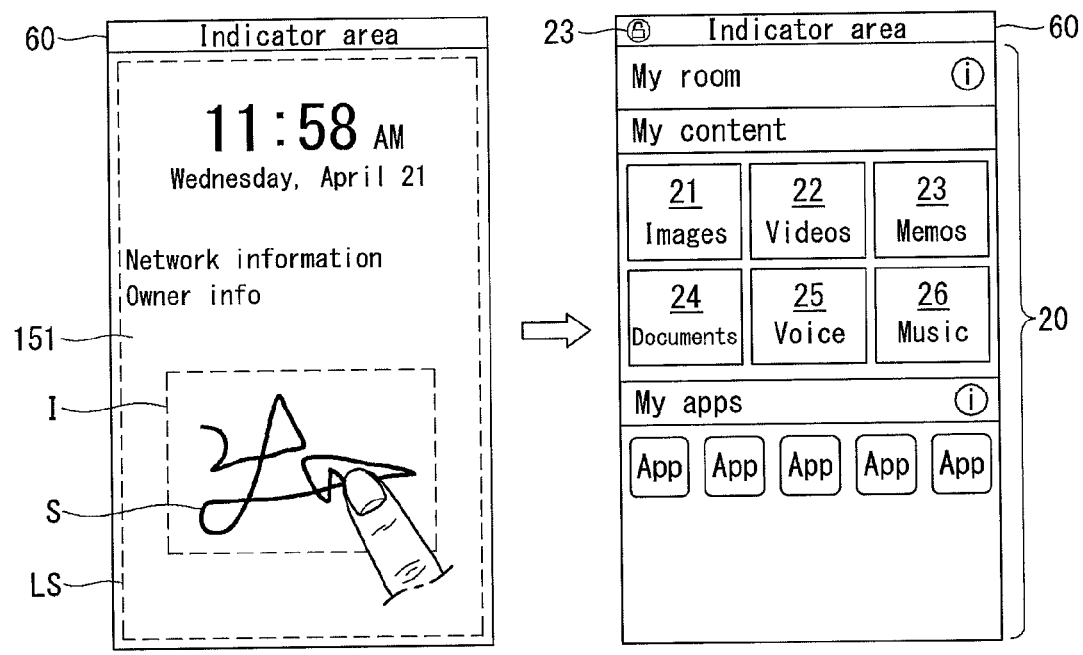
FIGS. 10 through 20 are views illustrating examples of activating a region for inputting a user signature according to the first embodiment of the present invention.

Referring to FIG. 10, when the mobile terminal 100 is in a lock mode, a lock mode screen LS may be displayed on the touch screen 151. The lock mode screen LS may be a screen in which only basic information such as clock, date, and the like, is displayed and which does not react to a touch input other than the user's touch input for releasing the locked state.

When a predetermined pattern password has been set to release the lock mode state, and when a touch input applied to a certain region of the touch screen 151 is received, the controller 180 can display a pattern guide allowing for inputting of the pattern password on the touch screen 151.

According to an embodiment of the present invention, before displaying the pattern guide on the lock mode screen LS, the controller 180 can activate a region I for receiving a user signature and receive a user signature S through the activated region I. When a long touch input applied to an empty space of the lock mode screen LS is received, the controller 180 can activate the region I for receiving a user signature. In order to visually differentiate the activated state of the region I, the controller 180 can highlight a frame line of the region I. The method of visually differentiating the activated state of the region I is not limited to the foregoing example and maybe variously modified to be implemented.

Thus, immediately when the lock mode state is released by the user signature S, the controller 180 can enter the secret folder, and display a secret folder screen 20 on the touch screen 151. The secret folder screen 20 is the same as described above with reference to FIG. 6(b).

Figure 11:
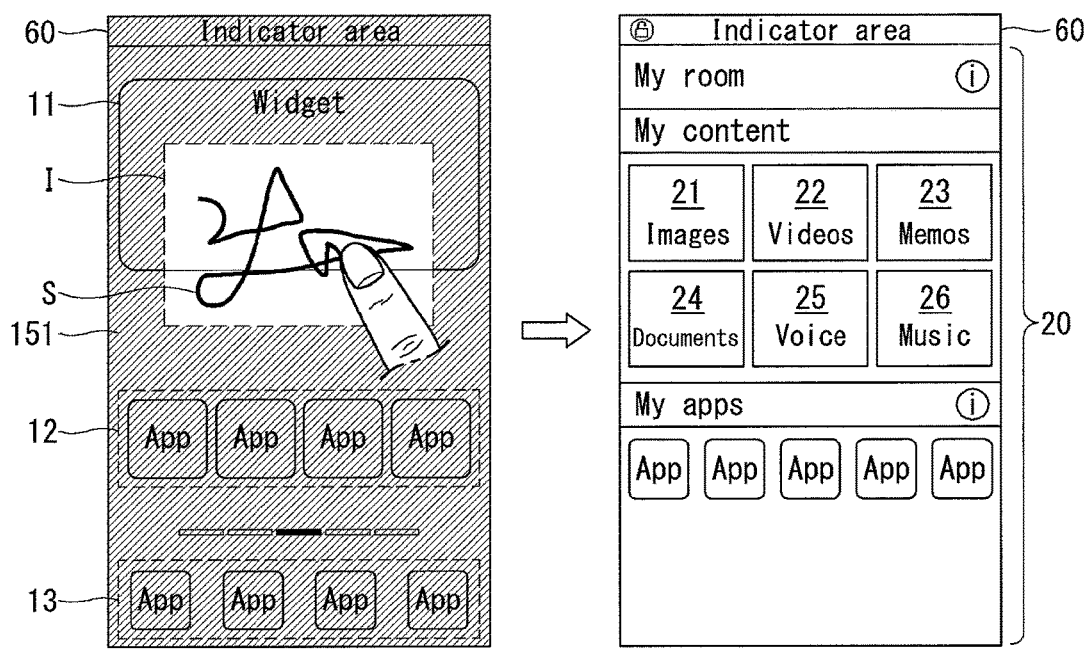

Referring to FIG. 11, when the lock mode of the mobile terminal 100 has been released so the mobile terminal 100 is normally available, and when a predetermined input (long touch input) applied to an empty space (a region in which an icon is not displayed) of the touch screen 151 is received, the controller 180 can activate the region I for receiving a user signature. When a pre-set user signature S is received through the region I, the controller 180 can enter the secret folder and display the secret folder screen 20 on the touch screen 151.

Figure 12:
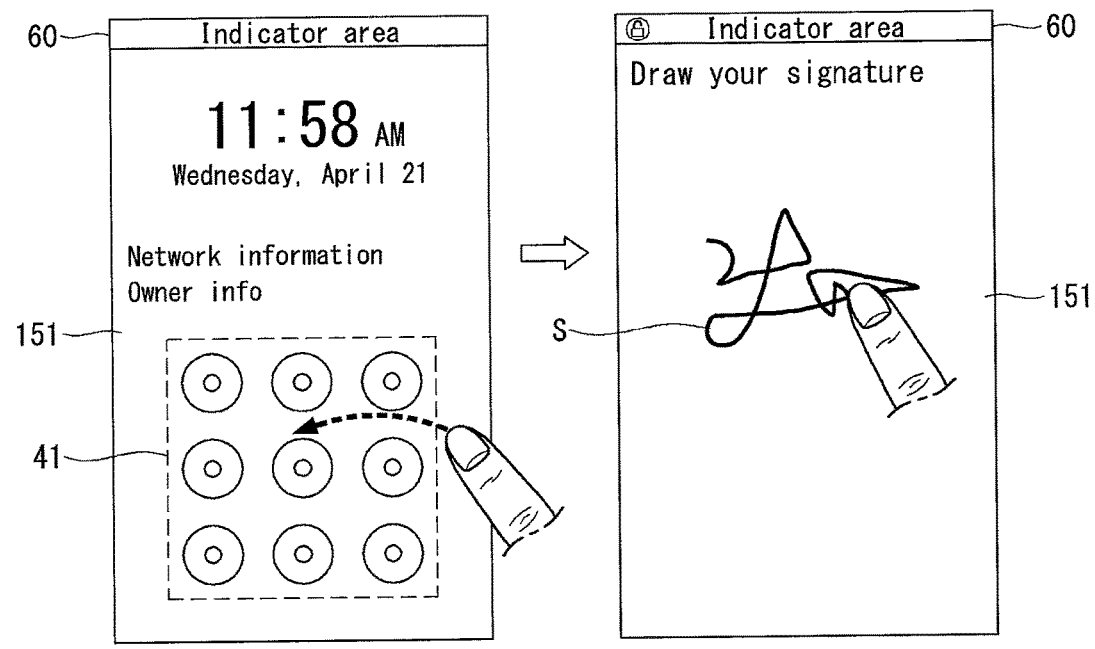

Referring to FIG. 12, when the mobile terminal 100 is in a lock mode, the controller 180 can display the lock mode screen LS on the touch screen 151, and In this instance, the controller 180 can also display a pattern guide 141 for releasing a pattern password. When the pattern guide 41 is displayed, and when a flicking input, rather than a touch input applied to a plurality of objects constituting the pattern guide 41, is received, the controller 180 can activate the region I for receiving a user signature and display the same in the entire area of the touch screen 151.

Figure 13:
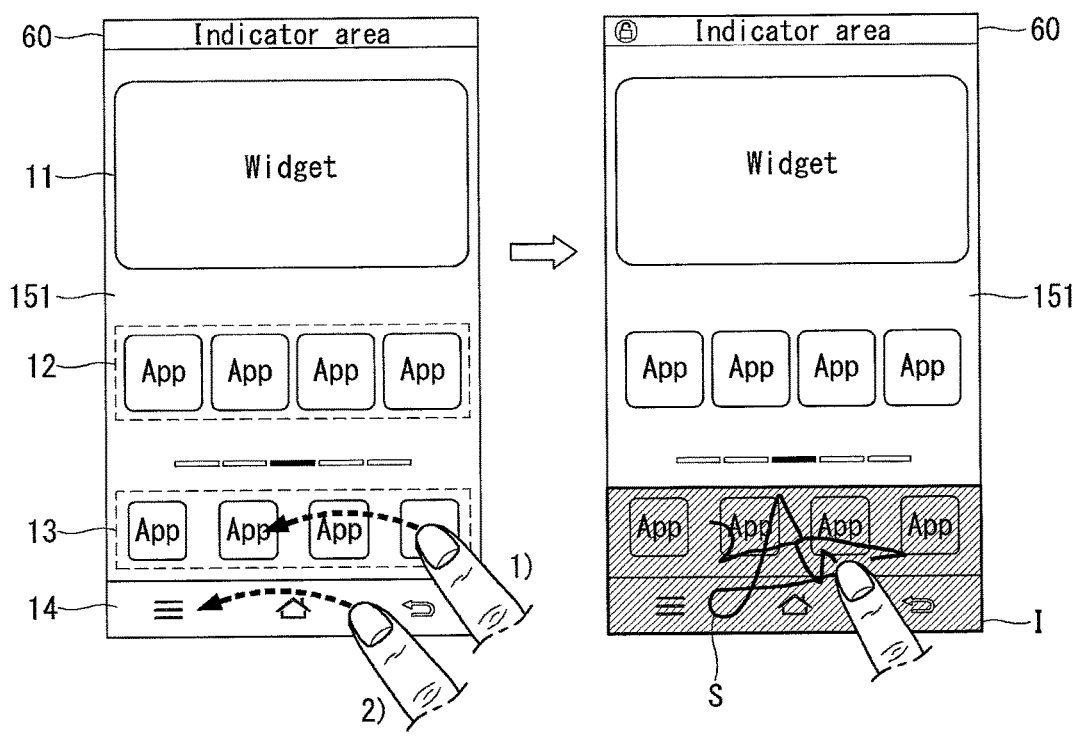

Referring to FIG. 13, when a flicking input applied to a particular region displayed on the touch screen 151 is received, the controller 180 can activate the region I for receiving a user signature such that it is displayed in the particular region. In the home screen illustrated in FIG. 6, when a flicking input applied to the second region 13 maintaining display of menus regardless of a user's flicking input is received, the controller 180 can activate the second region 13 as a signature region I. In this instance, the second region 12 may be deactivated such that it is not operated by a user's touch input.

Also, when a flicking input applied to a navigation key region 14 of the touch screen 151 is received, the controller 180 can activate and display the region I for receiving a user signature in the navigation key region 14. The navigation key region 14 may be a region in which a shortcut button to home screen, a cancel button, a main menu button, and the like, are provided as soft keys. When the navigation key region 14 is activated as the signature region I, various function buttons displayed in the navigation key region 14 may be deactivated and not operated by a user's touch input.

As illustrated in FIG. 13, through a flicking input with respect to the particular regions 13 and 14 on the touch screen 151, the corresponding region may be utilized as the signature region I, rather than separately displaying the signature region I.

When the signature region I is activated in a predetermined region of the touch screen 151, the controller 180 can change predetermined display characteristics or vibration characteristics to inform the user about the activation of the signature region I. The display characteristics may include an animation effect, a change in visual characteristics of the signature region I, and the like, provided when the signature region I is displayed. The vibration characteristics may include a vibration signal having a predetermined pattern output through the haptic module (153 in FIG. 1A) when the signature region I is activated.

Meanwhile, as illustrated in FIG. 13, the signature region I activated in a particular region in the entire area of the touch screen 151 may be displayed by changing a size and a position thereof through a user manipulation (e.g., a drag input).

Figure 14:
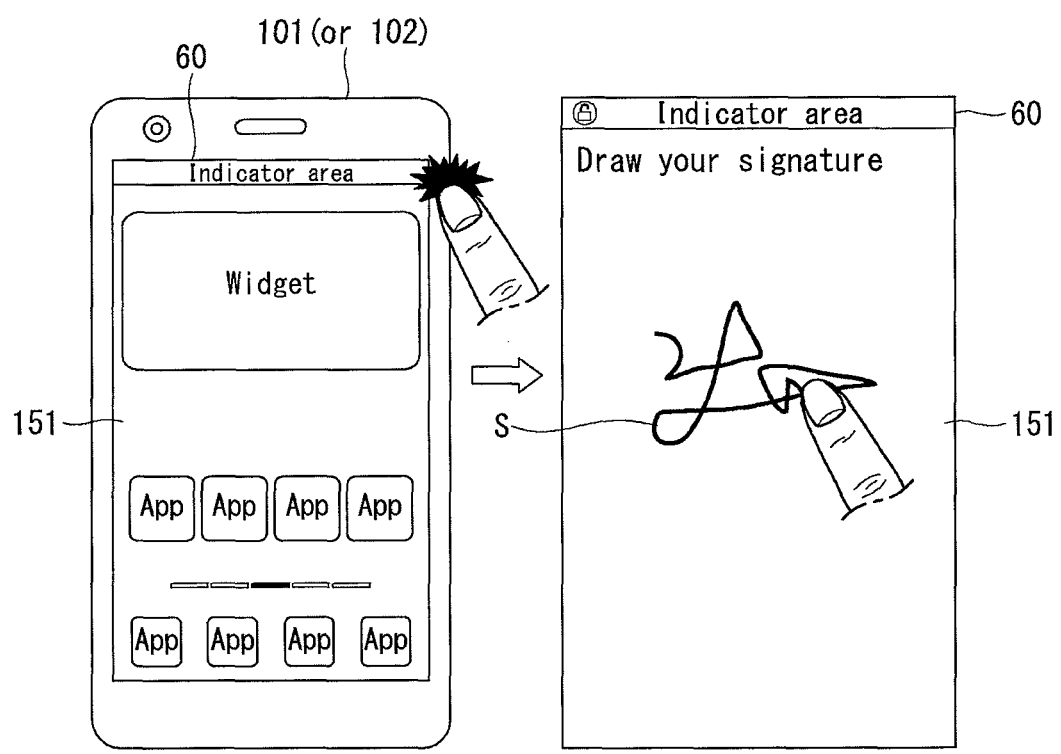

Referring to FIG. 14, when a stroke is input to at least a portion of the front case 101 or the rear case 102 of the mobile terminal 100 to generate predetermined vibration in the mobile terminal 100, the controller 180 can activate and display the region I for receiving a user signature on the touch screen 151.

Figure 15:
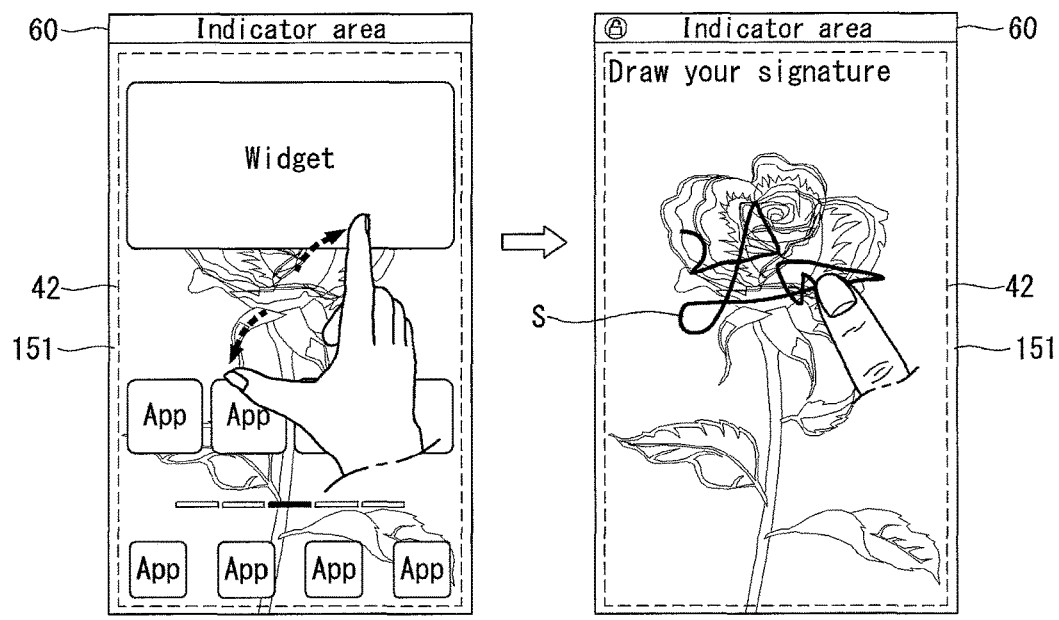

Referring to FIG. 15, the controller 180 can display at least one icon on the touch screen 151 on a predetermined background screen 42. When a pinch-out input applied to the touch screen 151 is received, the controller 180 can remove the at least one icon and maintain displaying of only the background screen 42. The controller 180 can activate and display the region I for receiving a user signature on the background screen 42.

Figure 16:
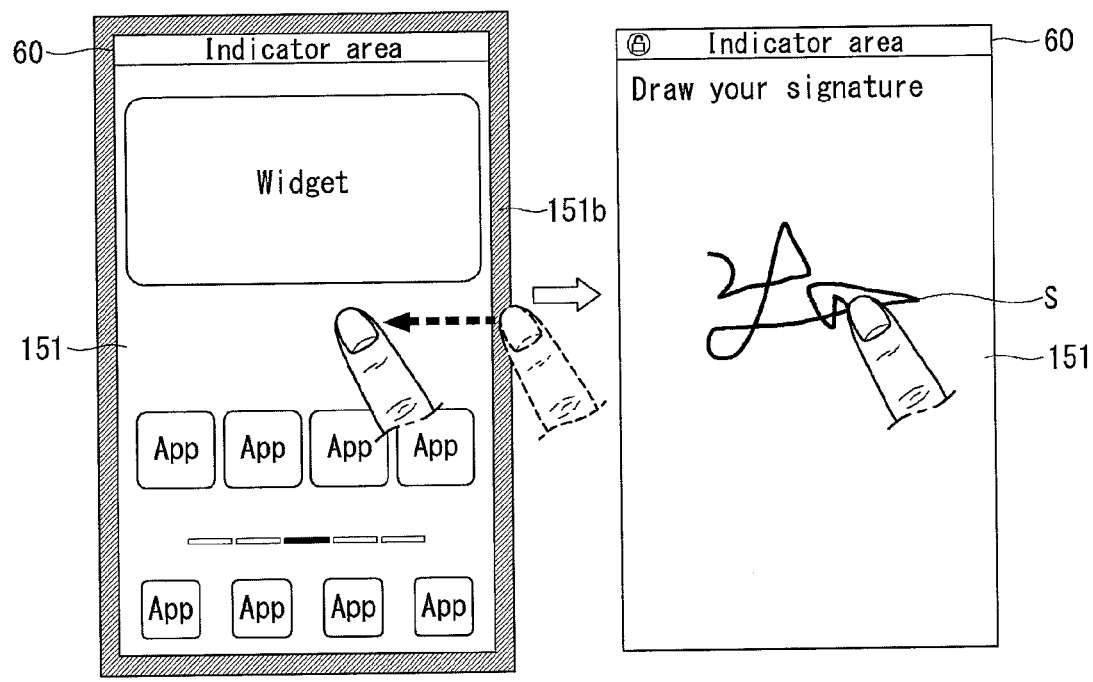

Referring to FIG. 16, the display unit 151 may be disposed on the front surface of the body of the mobile terminal 100 to output information. A window 151a of the display unit 151 may be installed in the front case 101 to form a front surface of the mobile terminal 100 together with the front case 101.

Besides the window 151a, the front surface of the mobile terminal 100 may have a bezel region 151b surrounding the window 151a. The controller 180 can sense a touch input starting from the bezel, and when a touch input starting from the bezel and extending to the window 151a is received, the controller 180 can activate the region I for receiving a user signature and display the same on the touch screen 151. The touch input starting from the bezel region and extending to the window 151a may be a touch input starting from any one of a left bezel and a right bezel. Here, the window 151a may be a component corresponding to the touch screen 151 in this document.

Figure 17:
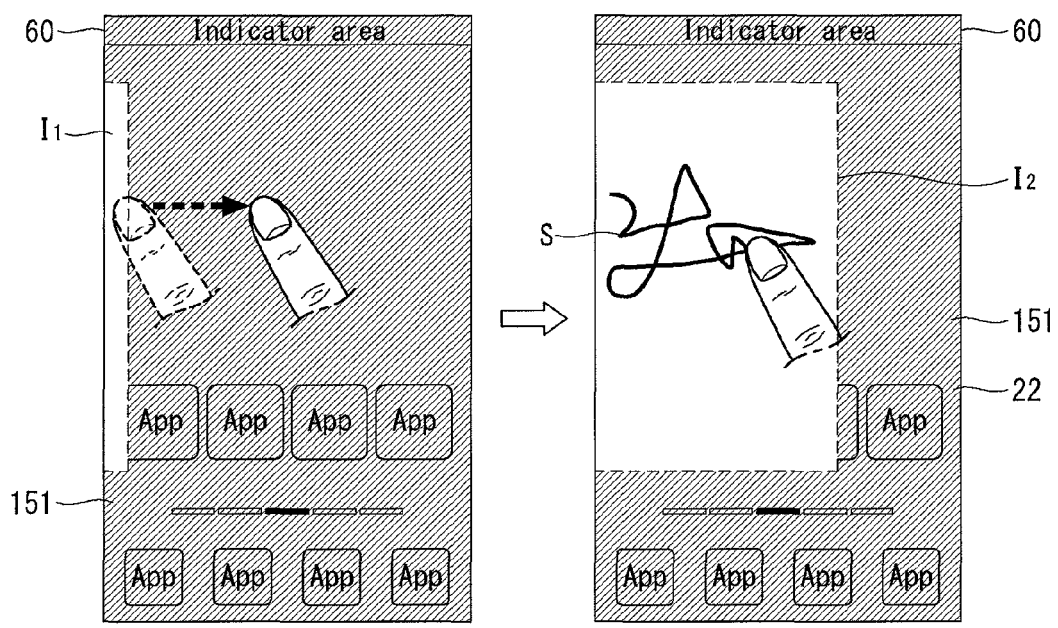

Referring to FIG. 17, the touch screen 151 may include at least one item in at least one page and provide the same. When a first page among a plurality of pages is displayed on the touch screen 151, when an input dragging starting from a left boundary region I1 to by more than a ⅓ region, a region I2 for receiving a user signature may slide to be displayed on the touch screen 151 in response to the drag input.

Figure 18:
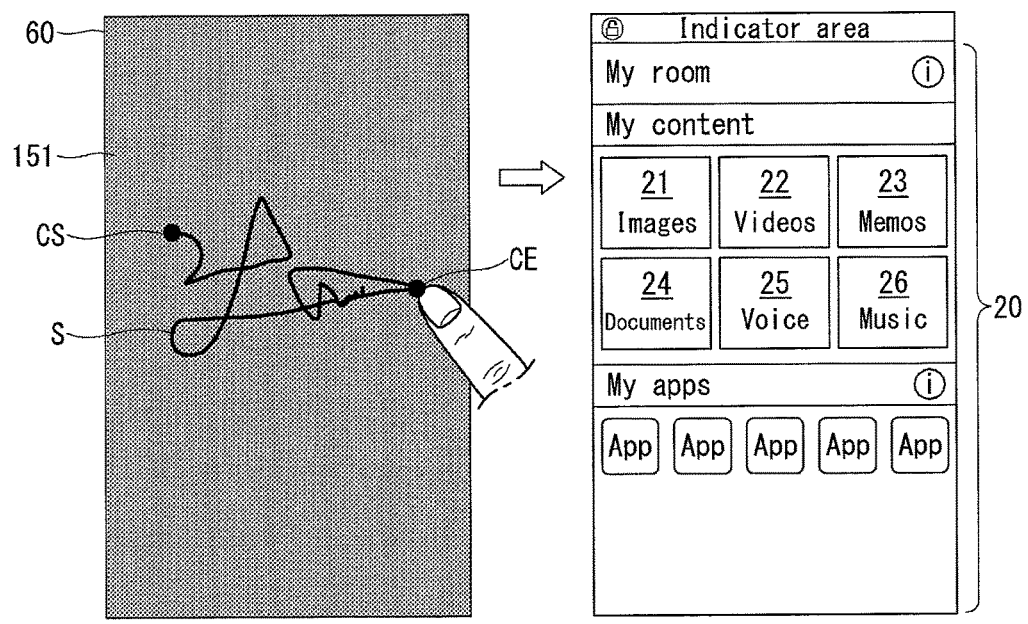

Referring to FIG. 18, when power supply to the touch screen 151 is cut off, when a touch input applied to a start point SC is maintained in a certain region of the touch screen 151 in order to start a user signature, the controller 180 can activate the region for inputting a user signature, and when a touch input applied to an end point SE at which the user signature is finished is maintained for more than a predetermined time, the controller 180 can enter the secret folder and display the secret folder screen on the touch screen 151, simultaneously when the display unit 151 is turned on.

When a lock pattern has been set in the mobile terminal 100, the controller 180 can turn on the display unit 151 to release the locked state to enter the secret folder.

Figure 19:
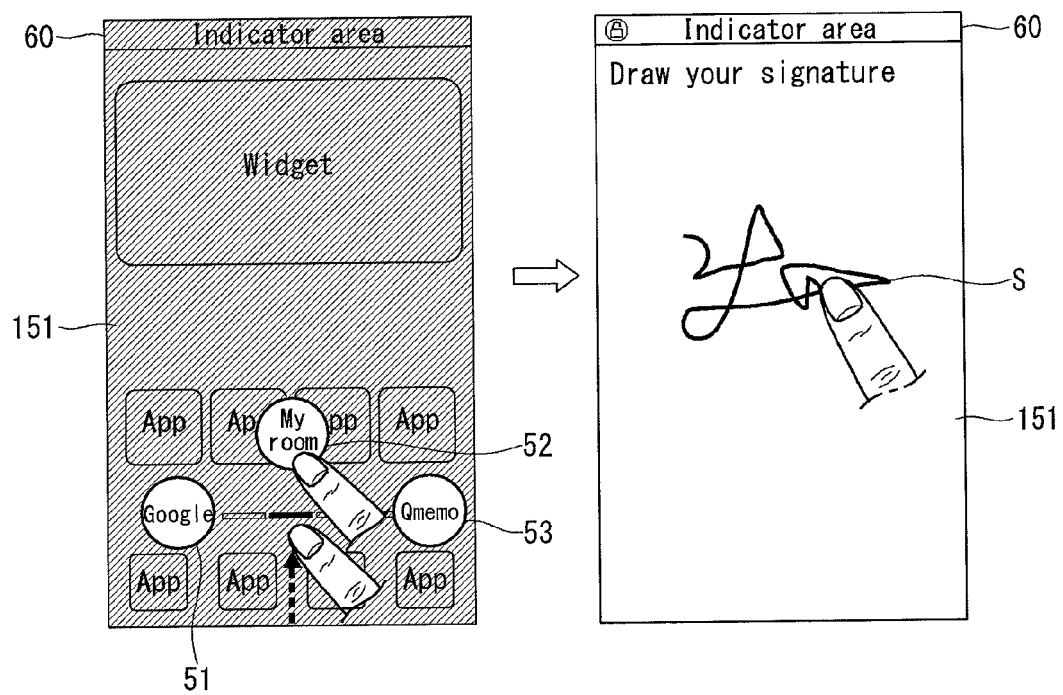

Referring to FIG. 19, when an input for selecting a particular menu for entering the secret folder is received, the controller 180 can activate a region for receiving a user signature to display the same on the touch screen 151. When a drag input starting from a lower boundary interface of the touch screen 151 and moving upwards is received, the controller 180 can provide at least one quick menu 51, 52, and 53. When the drag input is terminated in a menu 52 corresponding to the secret folder among the quick menus 51, 52, and 53, the controller 180 can activate a region for receiving a user signature and display the same on the touch screen 151.

Figure 20:
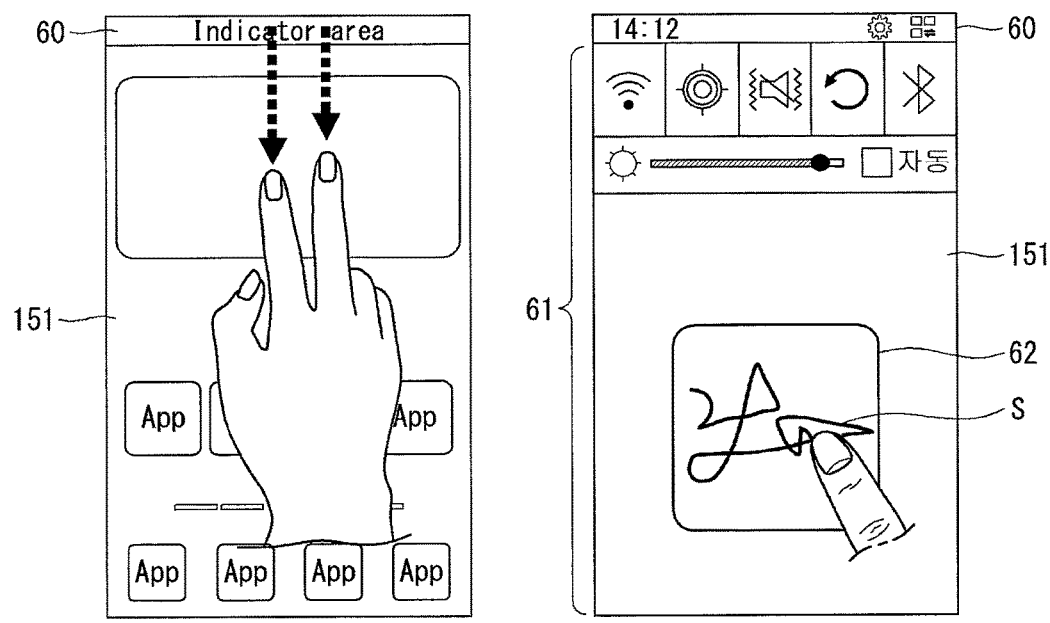

Referring to FIG. 20, the touch screen may include an indicator area 60 for displaying status information of the mobile terminal 100. When a touch input of dragging the indicator area 60 downwards by a multi-touch is received, the controller 180 can include the region 62 for receiving a user signature in a status window 61 sliding by the touch input, and display the same.

Namely, when the user drags the indicator area 60 with his or her finger, the controller 180 can provide the status window including status information of the terminal, and when the user drags the indicator area 60 with two fingers, the controller 180 can provide a user signature input region for entering the secret folder.

Figure 21:
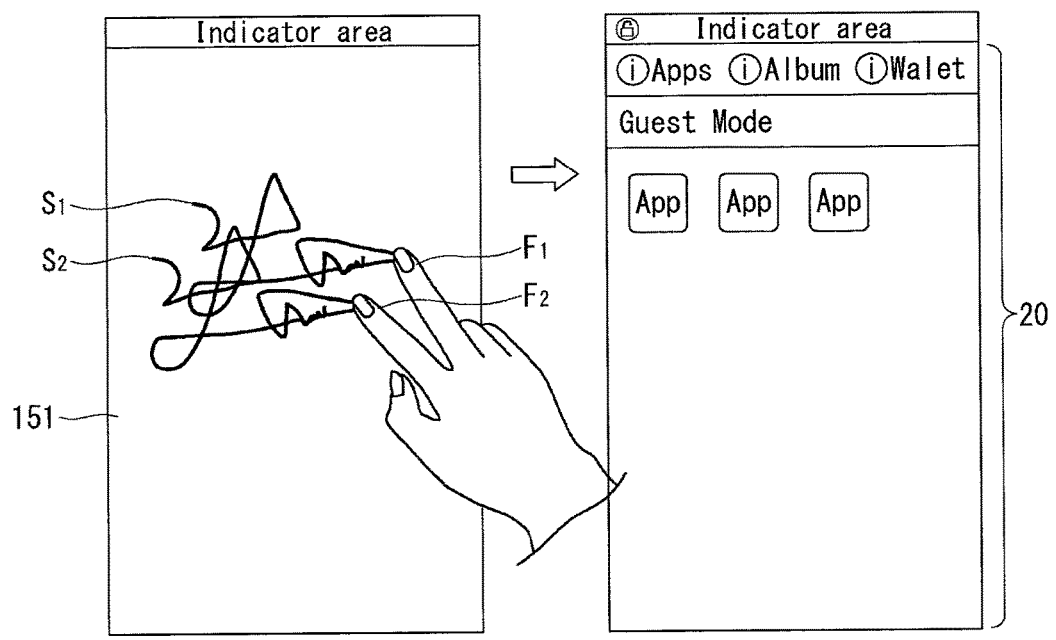
FIG. 21 is a view illustrating an example in which a signature is input as a multi-touch input according to the first embodiment of the present invention.

FIG. 21 is a view illustrating an example in which a signature is input as a multi-touch input according to the first embodiment of the present invention.

As for the secret folder provided according to an embodiment of the present invention, a guest mode environment, or the like, may be set by at least one depth. For example, in the guest mode, only applications included in the secret folder may be visible, while user personal information (e.g., health information, schedule information, physical information, financial information, or an image may not be visible.

This is because, an item included in the secret folder may need to be shown to a third party according to circumstances. Here, when user signatures S1 and S2 are input by two fingers F1 and F2 of the user, the controller 180 can enter the secret folder and set the secret folder in the guest mode to display a secret folder screen 20 in which particular information is concealed, among information of the secret folder, on the touch screen 151.

Figure 22:
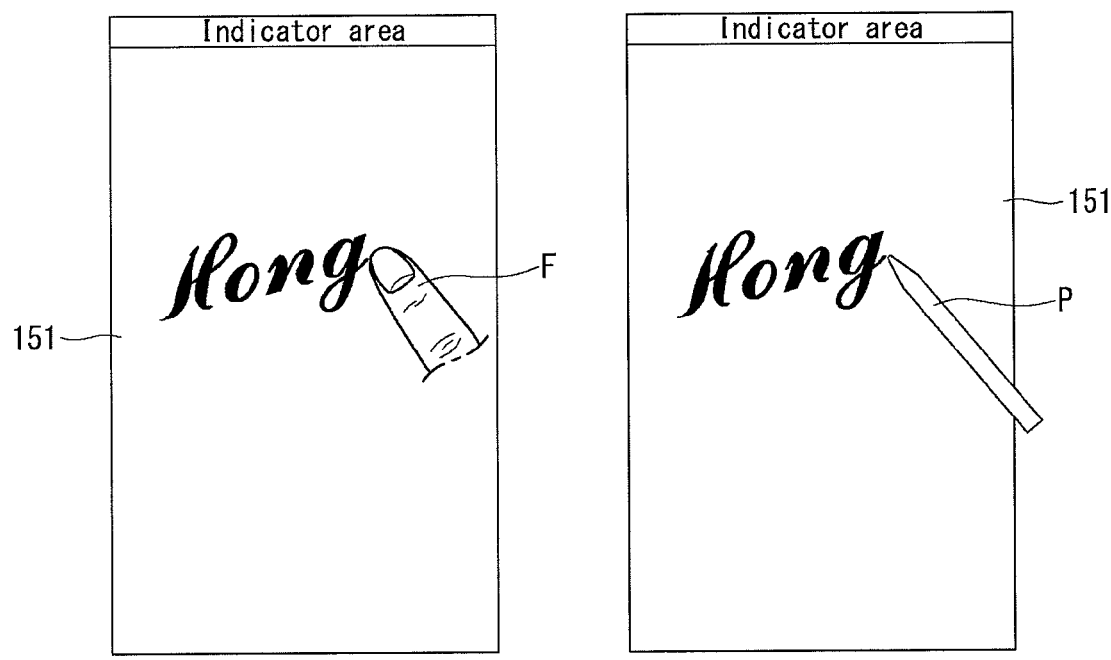
FIG. 22 is a view illustrating an example of differentiating ways to enter a folder when a user signature is input by a user's hand or by a pen.

FIG. 22 is a view illustrating an example of differentiating ways to enter a folder when a user signature is input by a user's hand or by a pen.

According to an embodiment of the present invention, when a region for receiving a user signature is activated, screens provided to enter the secret folder may be different set for a case in which a user signature is received by the user's finger F and for a case in which a user signature is received by a stylus pen P. For example, when a user signature is received by the stylus pen P of the user, the controller 180 can enter the secret folder in the guest mode described above with reference to FIG. 21. Unlike the input by the user's finger, when a user signature is input by a stylus pen, screens provided to enter the secret folder may be variously modified to be provided.

Figure 23:
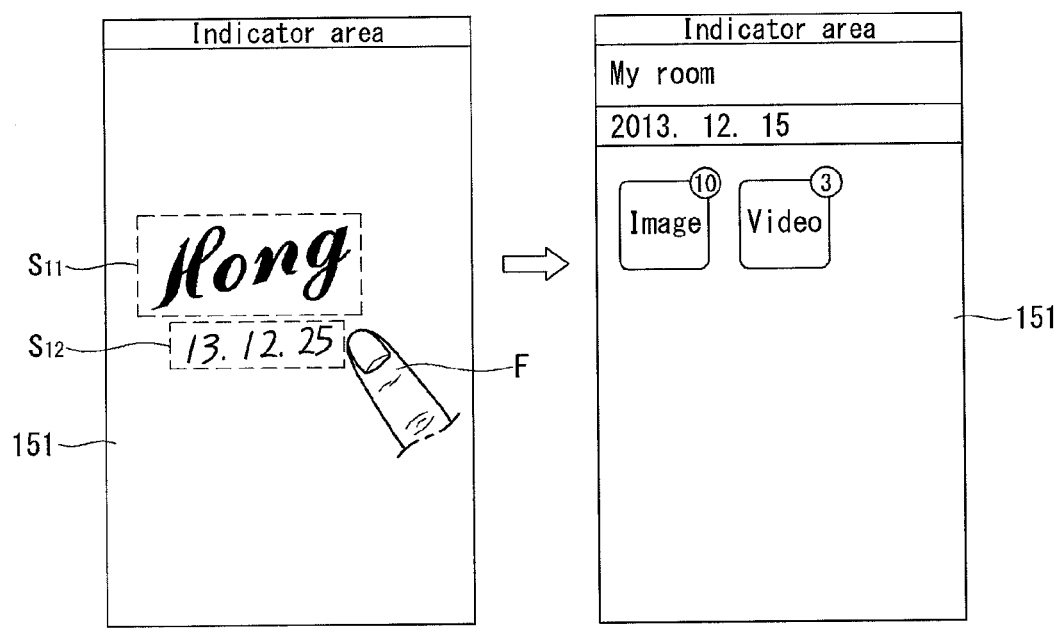
FIGS. 23 through 25 are views illustrating examples of differentiating ways to enter a folder according to a pattern of a user signature input according to the first embodiment of the present invention.
Figure 24:
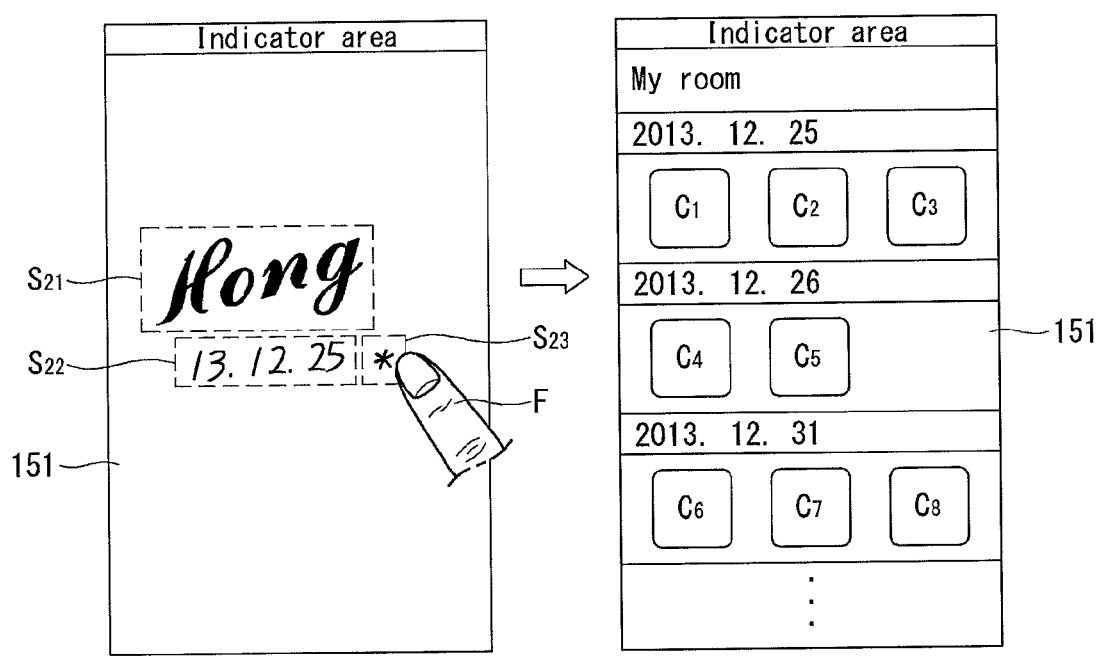
Figure 25:
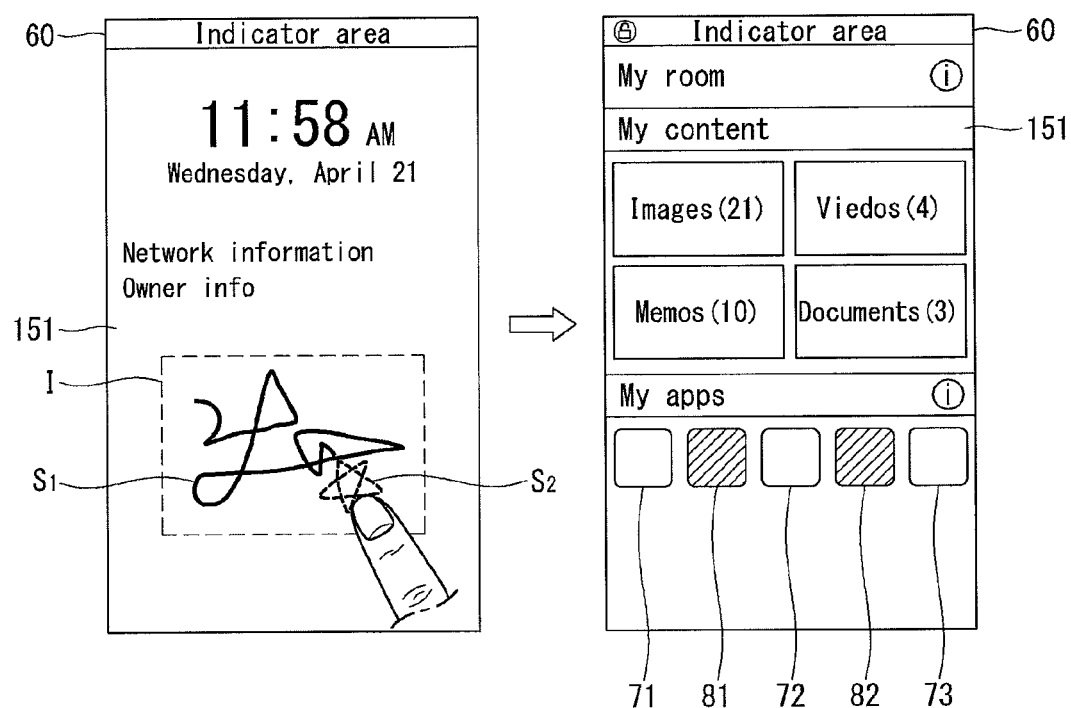

FIGS. 23 through 25 are views illustrating examples of differentiating ways to enter a folder according to a pattern of a user signature input according to the first embodiment of the present invention.

Referring to FIG. 23, when a region for receiving a user signature is activated, the controller 180 can receive a plurality of user signatures S11 and S12. The user signature may include a previously registered main signature S11 that identifies the user and has a predetermined trace and a tag S12 added to the main signature S11.

As illustrated in FIG. 23, after the main signature S11 (HONG) is input, when tags S12 "2013,12,25" is input, the controller 180 can recognize the tag S12 as Dec. 25, 2013, filter only content stored in the secret folder on Dec. 25, 2013, and provide the same to a first screen when entering the secret folder.

FIG. 23 illustrates ten images and three videos were added to the secret folder of the user on Dec. 25, 2013, and the controller 180 can conveniently access desired content among content stored in the secret folder through a predetermined filtering tag input after the main signature S11.

Meanwhile, the tag added to the main signature may include special symbols (*, #, @, , , ), in addition to information indicating a date. For example, referring to FIG. 24, after a main signature S21 is input, the controller 180 can receive an input applied to a tag S22 indicating a date and a tag S23 corresponding to a special symbol S23. The controller 180 can filter at least one content added after the date and display the same in a first screen provided when the secret folder is entered.

Namely, as illustrated in FIG. 24, after the main signature S21 is input, the controller 180 can receive an input applied to the tag S22 indicating a date and the tag S23 corresponding to a special symbol. The controller 180 can filter at least one content added after the date and display the same in a first screen when the secret folder is entered. Namely, as illustrated in FIG. 24, content C1, C2, C3, C4, C5, C6, C7, C7, C8, . . . added after Dec. 25, 2013 may be provided to the touch screen 151 immediately when the secret folder is entered.

Referring to FIG. 25, as described above, a security level may be set for information included in the secret folder, and content of each security level may be selectively initiated according to a pattern of an input signature. For example, after the main signature S1 is input, when the tag S2 having a predetermined pattern is additionally input, the controller 180 can provide items 81 and 82 having a higher security level, in addition to at least one item 71, 72, and 73 provided through the main signature S12.

Meanwhile, when the tag S2 is input, the controller 180 can control a real-time trace of the tag S2 not to be exposed to the touch screen 151. Alternatively, the controller 180 can expose a tag of a different trace, besides the original trace, to the touch screen 151 to strengthen security with respect the secret folder.

In the above, the example in which types of information initiated from the secret folder may vary according to a user signature pattern has been described. Hereinafter, an example in which content initiated from the secret folder is differentiated according to a relationship between the mobile terminal 100 providing the secret folder and an external device will be described.

Figure 26:
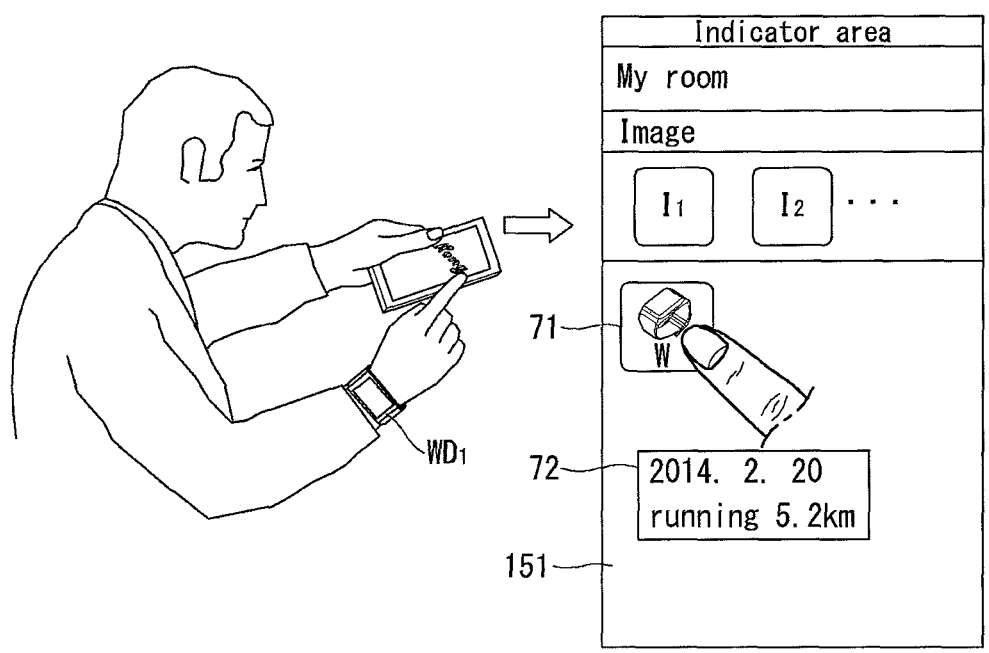
FIGS. 26 through 28 are views illustrating examples in which a user who wears a wearable device enters a folder through a user signature according to the first embodiment of the present invention.
Figure 27:
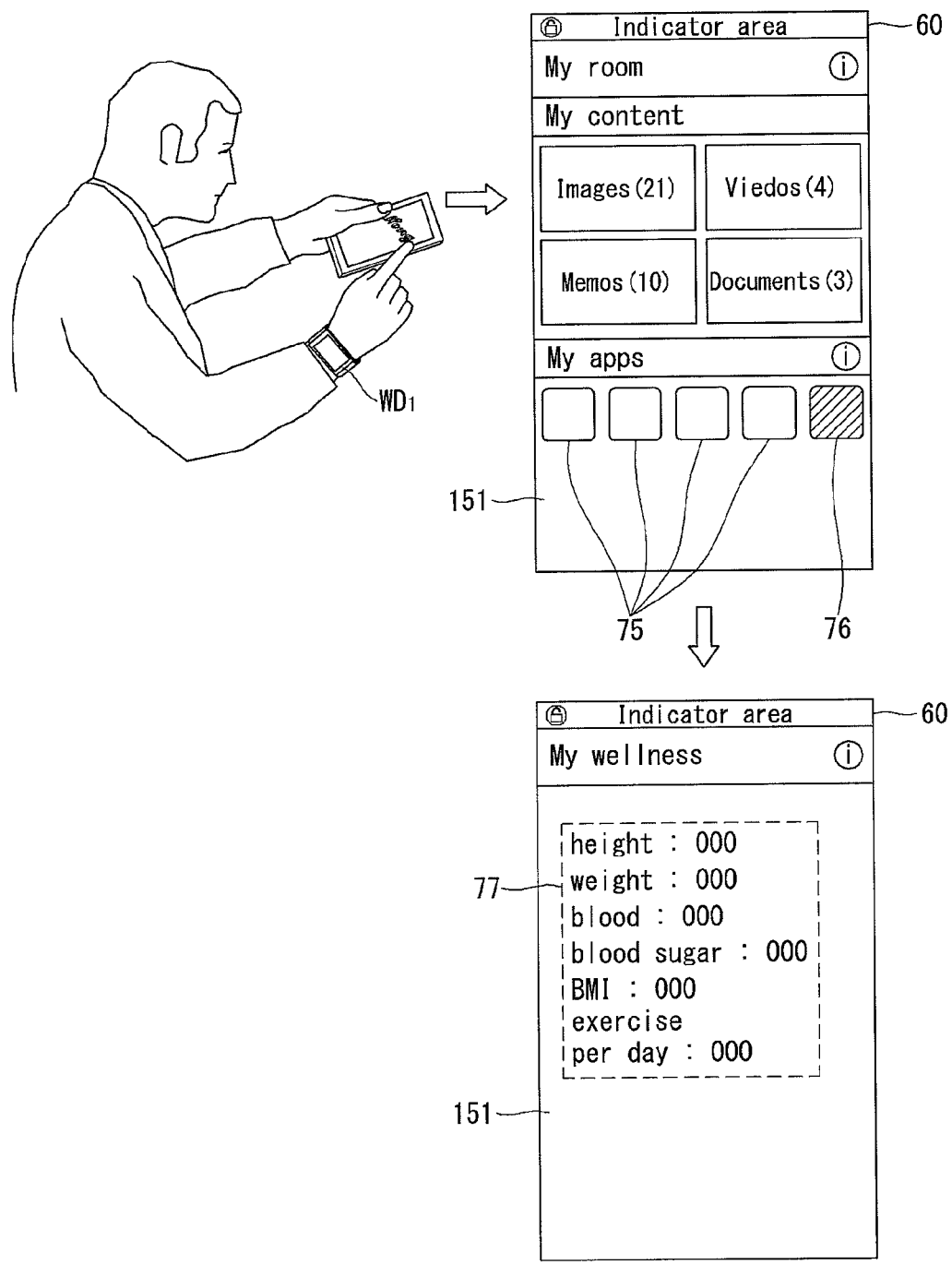
Figure 28:
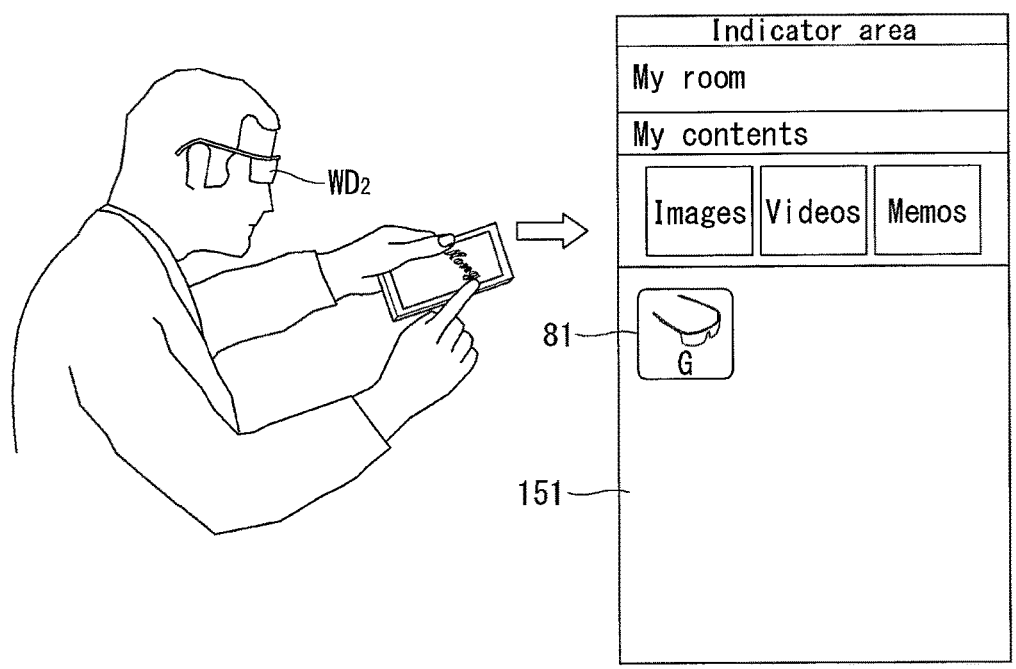

FIGS. 26 through 28 are views illustrating examples in which a user who wears a wearable device enters a folder through a user signature according to the first embodiment of the present invention.

The mobile terminal 100 according to an embodiment of the present invention may be paired with a watch-type wearable device WD1 worn by the user through wireless communication. When the user wears the watch-type wearable device WD1, the user may input a user signature to the touch screen 151 of the mobile terminal 100. When the user signature is received, the controller 180 can enter the secret folder and simultaneously receive personal information stored in the watch-type wearable device WD1 and display the same on the secret folder screen.

For example, when the user wear the wearable device, does exercise, and stores an exercise record, the personal information delivered to the mobile terminal 100 may be corresponding exercise record information.

For example, when the secret folder is entered, the controller 180 can display an icon W 71 corresponding to the paired watch-type wearable device WD1 on the secret folder screen. When an input for selecting the icon WB 71 is received, the controller 180 can display the exercise record information 72 received from the watch-type wearable device WD1 on the touch screen 151.

Meanwhile, a process of receiving personal information from the watch-type wearable device WD1 may vary. For example, when the user, who wears the watch-type wearable device WD1, performs a user signature, the controller 180 can enter the secret folder, when the icon W 71 provided to the secret folder screen is selected, the controller 180 can transmit a signal for requesting predetermined information to the watch-type wearable device WD1 and receive corresponding information.

Meanwhile, according to the embodiment of the present invention, according to a type of application being executed in the watch-type wearable device WD1, information related to the application may be provided through the secret folder.

For example, while the user, who wears the watch-type wearable device WD1, is conducting Internet banking through the watch-type wearable device WD1, when a user signature is received through the mobile terminal 100, the controller 180 can enter the secret folder and display financial information used for the Internet banking on the touch screen 151 simultaneously when the secret folder is entered. In the foregoing example, the case in which Internet banking is executed through the watch-type wearable device WD1 has been described, but the present invention is not limited thereto.

Meanwhile, according to a type of application being executed in the watch-type wearable device WD1, the controller 180 can check information currently required for the user through a context awareness module and provide appropriate information from the secret folder.

Referring to FIG. 27, when the user, wearing the watch-type wearable device WD1, inputs the user signature, the controller 180 can provide an application 76 providing user health information together with a general application 75. Also, when the application 76 is selected, the controller 180 can display user physical information, health information, and the like, on the touch screen 151. Meanwhile, referring to FIG. 28, when the user signature is input, the wearable device paired with the mobile terminal 100 is the glass type wearable device WD2.

In this instance, at least one image captured through the glass type wearable device WD2 may be immediately transmitted to the secret folder through the user signature in the mobile terminal 100. As described above with reference to FIG. 27, the controller 180 can display the icon 81 corresponding to the glass type wearable device WD2 on the secret folder screen. In the above, the examples in which the secret folder is entered through a user signature according to the first embodiment of the present invention have been described. Hereinafter, various embodiments in which notification information related to the secret folder is displayed through a user signature without having to enter the secret folder will be described.

Figure 29:
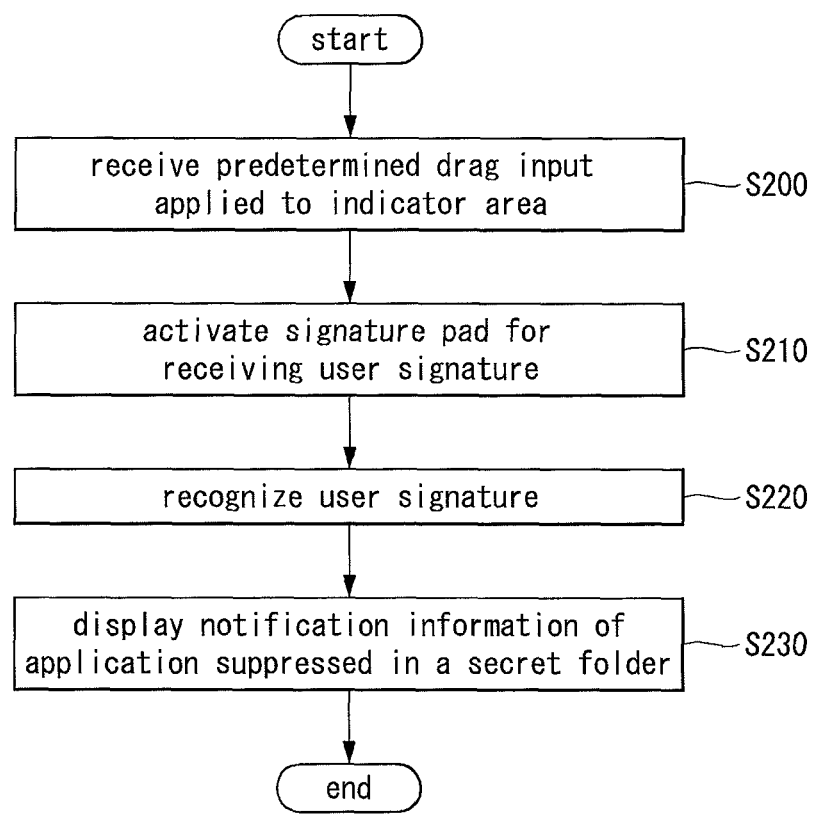
FIG. 29 is a flow chart illustrating a method for controlling a mobile terminal according to a second embodiment of the present invention.

FIG. 29 is a flow chart illustrating a method for controlling a mobile terminal according to a second embodiment of the present invention. FIG. 30 through 36 are views illustrating examples of implementing the method for controlling a mobile terminal according to a second embodiment of the present invention.

The method for controlling a mobile terminal according to the second embodiment of the present invention may be implemented by the mobile terminal 100 described above with reference to FIGS. 1A through 1C. Hereinafter, the method for controlling a mobile terminal according to the second embodiment of the present invention and operations of the mobile terminal 100 for implementing the same will be described in detail with reference to relevant drawings. Also, the second embodiment may be implemented based on the first embodiment.

Referring to FIG. 29, the controller 180 can receive a predetermined drag input applied to an indicator area (S200). The indicator area may be a region of the touch screen 151 for schematically displaying an operational state of the mobile terminal 100, which may be displayed in the uppermost end of the touch screen 151.

The predetermined drag input may be an input, starting from the indicator area, dragged downwards. The drag input may include a drag input by one finger of the user or a drag input by two fingers of the user. In response to the drag input, the controller 180 can activate a signature pad for receiving a user signature (S210).

The controller 180 can receive a user signature by the signature pad and recognize an input signature (S220). In the method of recognizing the user signature, text, a symbol, or the like, may be recognized by applying a predetermined symbol and character recognition algorithm, and a detailed description thereof will be omitted.

When the user signature is recognized, the controller 180 can display notification information of an application concealed in a secret folder on the signature pad (S230).

According to the second embodiment of the present invention, various types of notification information regarding items kept in storage in the secret folder may be conveniently provided by utilizing the indicator area without having to enter the secret folder. Namely, in order to check update information regarding an item kept in the secret folder, in general, the secret folder is entered through input of a user signature and an updated application is selected, thus checking updated content.

However, according to the embodiment of the present invention, when a user signature is received through the indicator area of the mobile terminal, a plurality of operations as described above may be omitted and notification information related to the secret folder may be easily accessed by using the indicator area.

Figure 30:
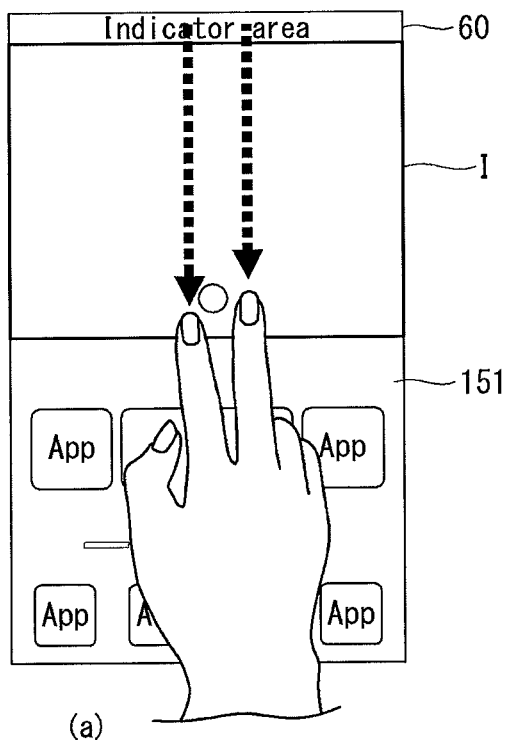
FIG. 30 includes views illustrating examples of implementing the method for controlling a mobile terminal according to the second embodiment of the present invention.
Figure 30:
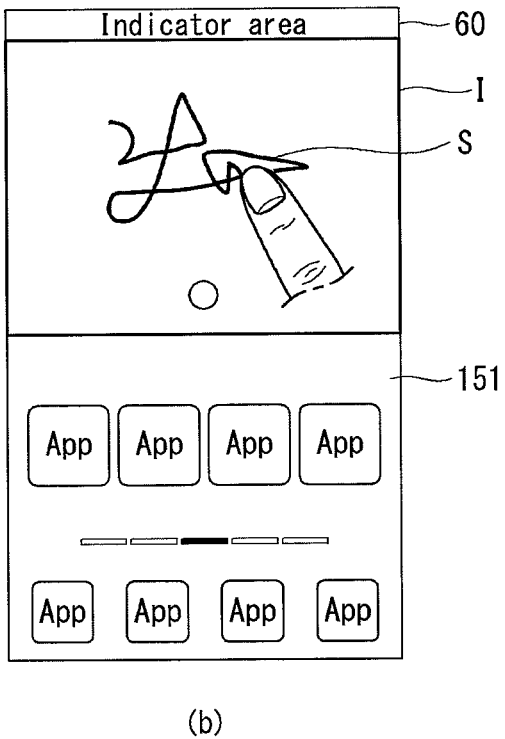
Figure 30:
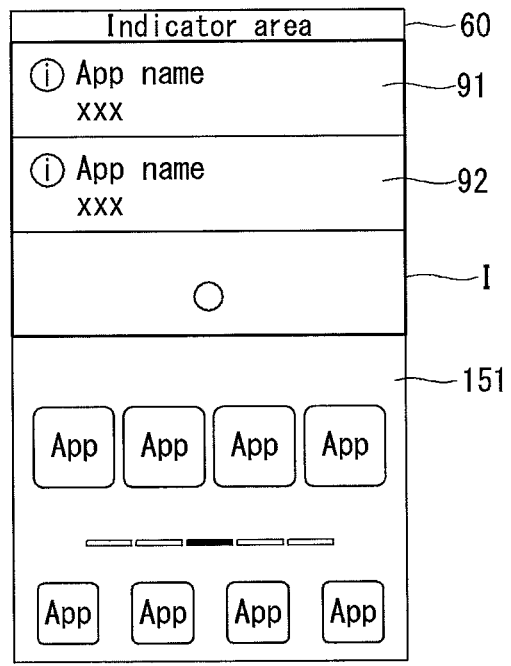

Referring to FIG. 30, the predetermined drag input with respect to the indicator area 60 may be a drag input by a multi-touch applied to the indicator area 60. When a downward drag input by two fingers of the user is received, the controller 180 can slide the signature pad I such that it overlaps with a screen currently displayed on the touch screen 151 according to the drag input, so as to be provided. When a user signature is input to the signature pad I, the controller 180 can display update notification information of an application kept in storage in the secret folder in the signature region.

The notification information may include version-up information of the application, message transmission/reception notification information, and the like, and the notification information may include rough summary information related to the updating. For example, when the application is a messenger, received message content may be displayed in a preview form.

Accordingly, the notification information related to the secret folder may be easily checked by using the indicator area, without having to enter the secret folder. Other examples in which notification information related to the secret folder is accessed through the indicator area 60 will be described with reference to the accompanying drawings.

Figure 31A:
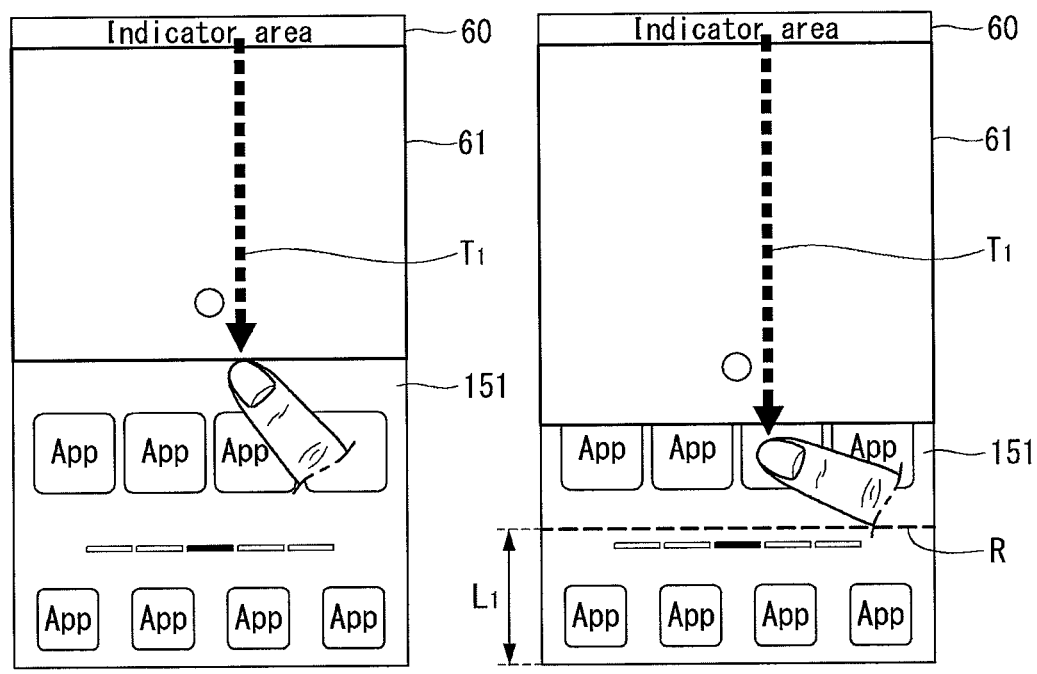
FIGS. 31A through 41 are views illustrating various examples of providing notification information related to a secret folder through user manipulation with respect to an indicator area according to the second embodiment of the present invention.

Referring to FIG. 31A, the controller 180 can receive a drag input T1 dragging the indicator area 60 downwards. In response to the drag input, the controller 180 can slidably display a status window 61. When the status window 61 slides by more than a predetermined length (for example ½ of a vertical length of the touch screen 151), the controller 180 can display a reference line R at a spot corresponding to a particular distance L1 from a lower end region of the touch screen 151. Namely, the reference line R may be induced to lengthen the downward drag input T1 to the reference line R.

The particular distance L1 spaced apart from the lower end region of the touch screen 151 may be a length corresponding to ¼ of the vertical length of the touch screen 151. The particular length L1 may be set by the user and stored in the memory in advance.

Figure 31B:
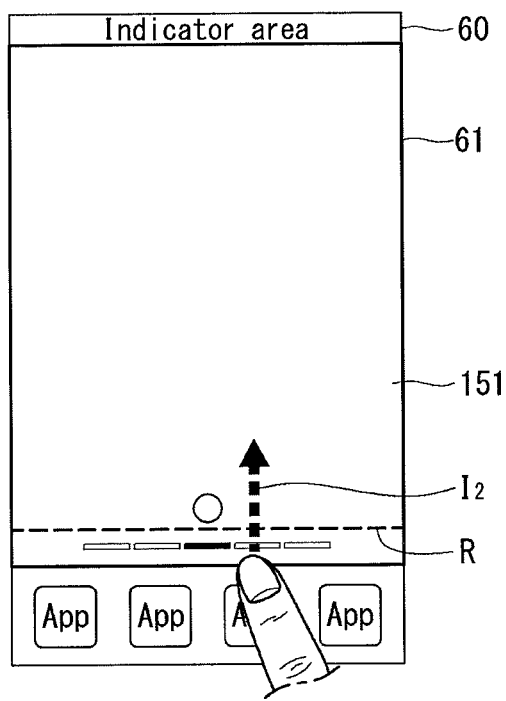
Figure 31C:
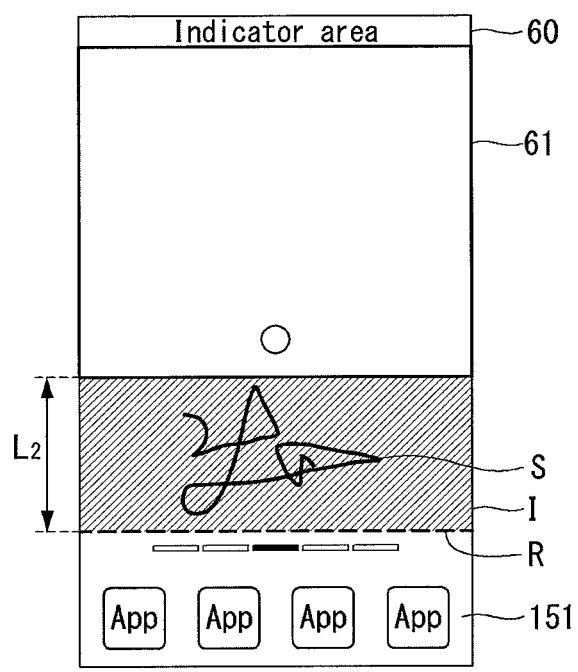

Referring to FIGS. 31B and 31C, after the downward drag input T1 passes through the reference line R, the controller 180 can receive an upward drag input T2. The controller 180 can activate the signature pad I by a length L2 by which the status window 61 is moved upwards from the reference line R. In this instance, the signature pad I and the status window 61 may be discriminated.

Figure 31D:
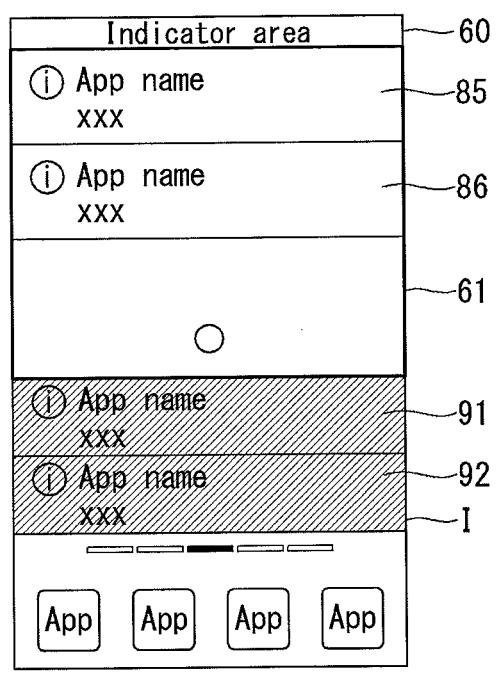

Referring to FIG. 31D, when a user signature S is received by the activated signature pad I, the controller 180 can display notification information 91 and 92 related to the secret folder on the signature pad I. Meanwhile, the status window 61 displayed on the signature pad I may display general status information 85 and 86 of the mobile terminal 100.

Namely, according to the embodiment of the present invention, the status window 60 displaying general status information of the terminal and the signature pad I region for checking notification information related to the secret folder may be separately used through user manipulation with respect to the indicator area 60 of the mobile terminal 100. As described above, the user manipulation may include various inputs of moving the status window, which slides downwards due to the downward drag input applied to the indicator area 60, upwards again.

Meanwhile, in the above, the example in which the reference line R is displayed at a spot of the particular distance L from the lower end region of the touch screen 151 has been described, but the present invention is not limited thereto.

For example, the controller 180 can display an object allowing for intuiting the secret folder at a spot of a particular distance L1. The object allowing for intuiting the secret folder may include an icon object related to the secret folder. Namely, the object may include any object indicating how far the downward drag input is to extend to activate a space for inputting a user signature. The object indicating how far the downward drag input is to extend may include a graphic object having a tack shape.

In the above, the example in which the reference line R is provided according to the downward drag input applied to the indicator area 60 has been described, but an example in which the indicator area 60 is used upon being divided into a general status window 61 and the signature pad I when the reference line R is not provided will be described with reference to FIGS. 32A and 32B.

Figure 32A:
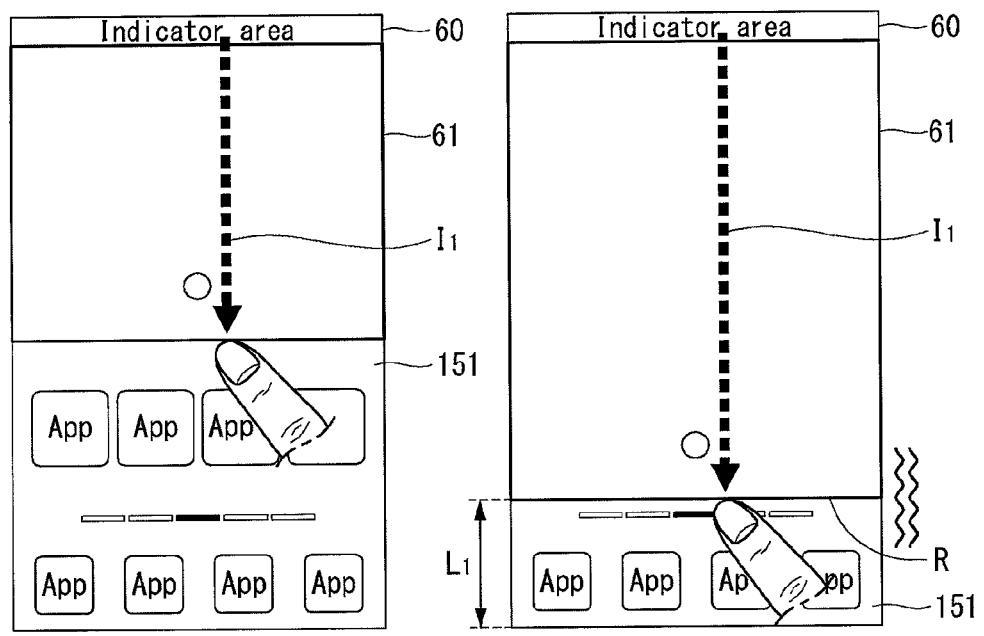

Referring to FIG. 32A, the controller 180 can receive an input T1 of downwardly dragging the indicator area 60, and slidably display the status window 61. When the status window 61 extends from a lower end region of the touch screen 151 by a particular distance L1, the controller 180 can generate vibration. The vibration may be generated through a haptic module 153 (please refer to FIG. 1A) provided in the mobile terminal 100. The vibration may be used as a means for informing the user that the signature pad I region may be activated by moving the status window 61 upwards.

Figure 32B:
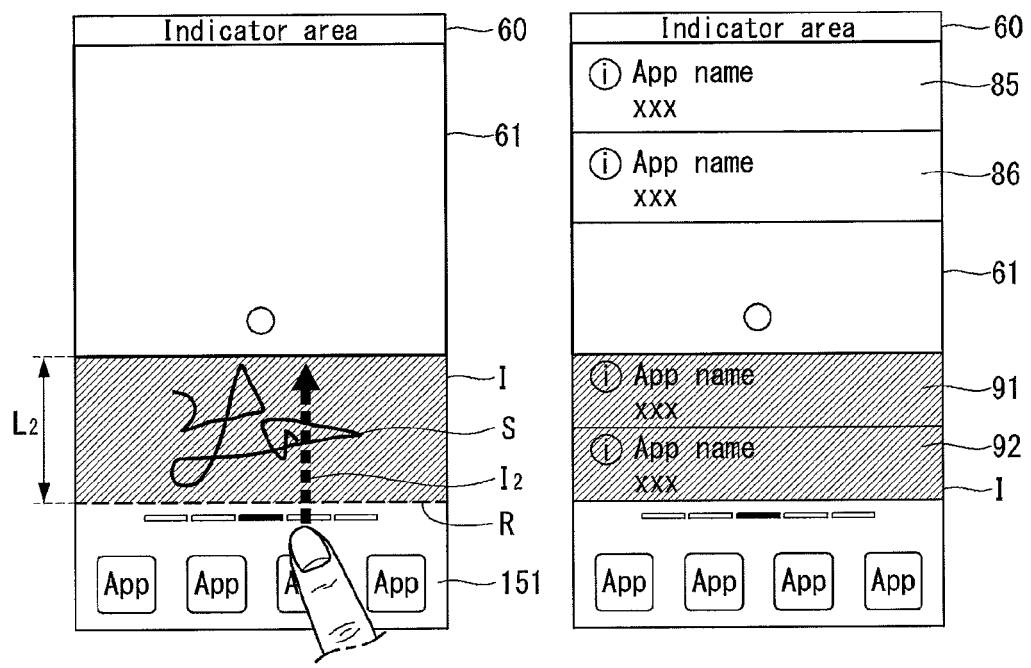

Referring to FIG. 32B, the controller 180 can activate the signature pad I extending from a spot at which the vibration was generated by a length L2. In this instance, the signature pad I and the status window 61 may be discriminated, and notification information related to the secret folder may be provided through the signature pad I region.

Meanwhile, FIGS. 32A and 32B illustrate an example in which the spot from which the downward drag input starting from the indicator area 60 is changed into the upward drag input is informed through vibration, but the notification about the change spot may be provided in various manners. For example, when the downward drag input reaches the change spot, a color of at least a partial surface of the touch screen 151 may be changed.

In the above, the example in which the notification information related to the secret folder is accessed by dragging the indicator area 60 of the touch screen 151 downwards to a predetermined spot and changing it into an upward movement has been described.

However, the signature pad I may also be activated without moving the indicator area 60 downwards to the predetermined spot. This will be described with reference to FIGS. 33A and 33B hereinafter.

Figure 33A:
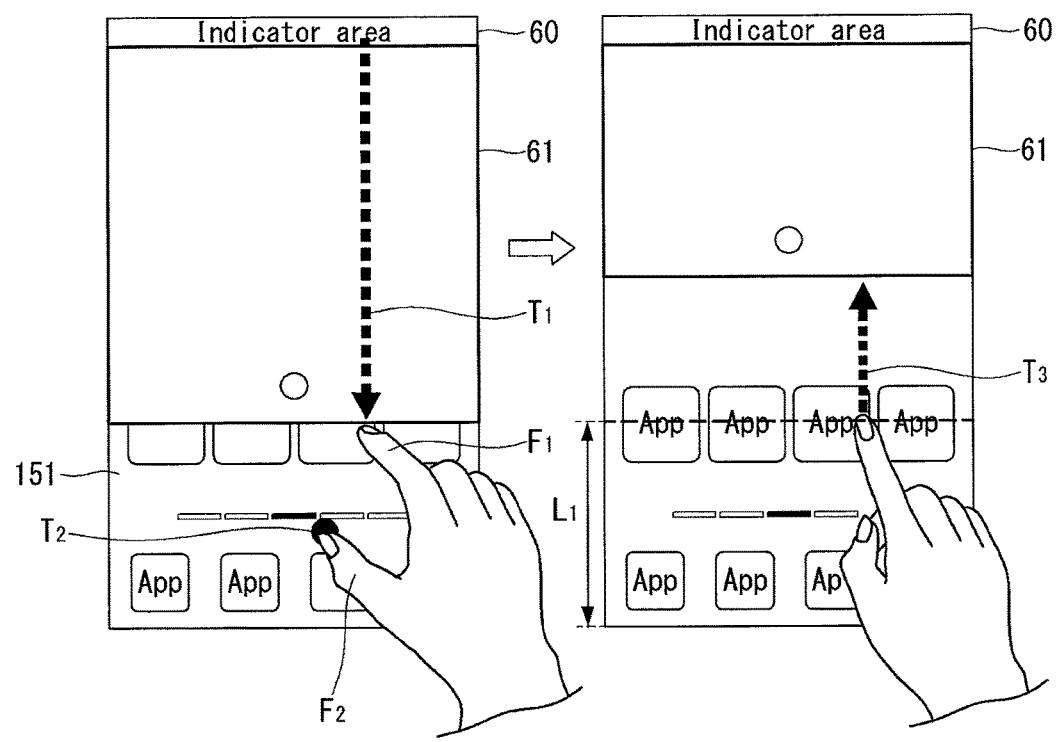
Figure 33B:
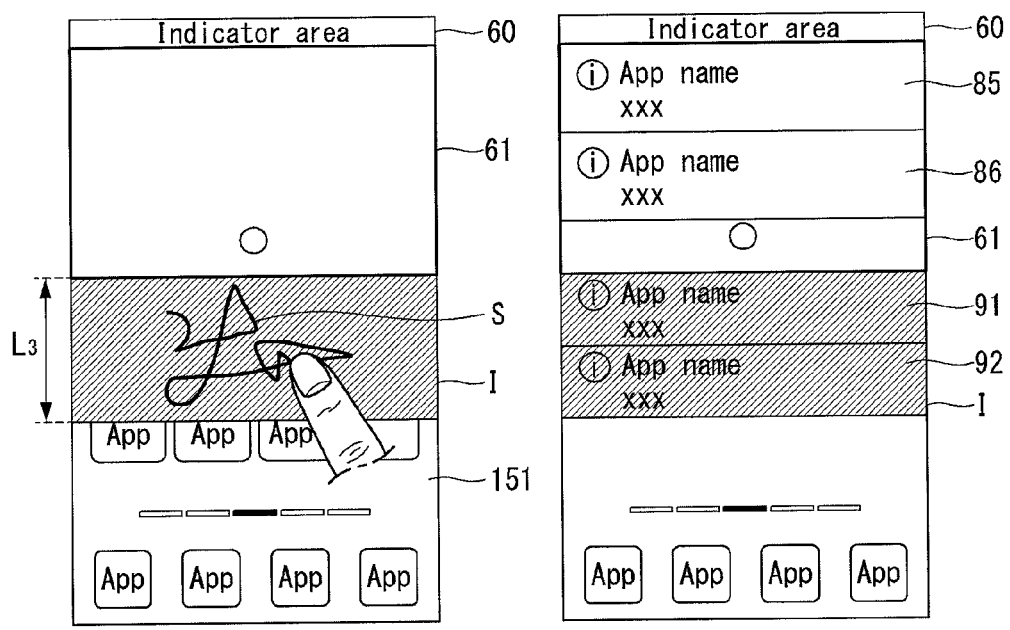
Figure 33C:
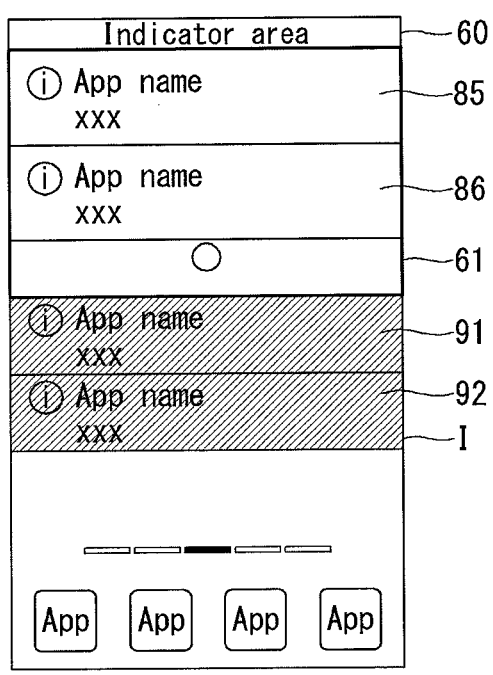

Referring to FIGS. 33A and 33B, the controller 180 can maintain the downward drag input applied to the indicator area 60 with a first finger, and when a touch input applied by a second finger to the touch screen 151 is received, the controller 180 can fix the position of the downwardly moved status window 61.

In more detail, after the first input T1 of dragging the indicator area 60 with the first finger F1 of the user is received, the controller 180 can receive the second input T2 applied by the second finger F2 that touches a certain spot in the vicinity of the dragged spot or within the particular distance L1 from the lower end region of the touch screen 151, while the first input T1 is being maintained.

General status information of the mobile terminal may be displayed on the status window 61 slidably displayed by the first input T1. Here, when only the first input T1 is received and the second input T2 does not exist, if the first input T1 is released (the drag input is released), the status window 61 may be returned to the original state (it is moved upwards to disappear).

Meanwhile, due to the second input T2, after the status window 61 is fixed to the second input T2 spot, a third input T3 of dragging the status window 61 upwards again may be received. The third input T3 may be an input dragged upwards by a predetermined distance (e.g., L3) from the second input T2 spot. Then, the controller 180 can activate the signature pad I corresponding to the predetermined distance L3. The status window 61 is displayed above the signature pad I.

When a user signature is received by the activated signature pad I, the controller 180 can display the notification information 91 and 92 related to the secret folder in the signature pad I. Meanwhile, the status window 61 displayed on the signature pad I may display general status information 85 and 86 of the mobile terminal 100.

Meanwhile, a rear surface of the mobile terminal 100 according to the embodiment of the present invention may include a rear input module. The rear input module may be positioned to be adjacent to the camera module exposed to the rear surface of the terminal body. The rear input module may be manipulated to receive an input for controlling an operation of the mobile terminal 100, and here, input content may be variously described. For example, commands such as ON/OFF of power, start, end, scroll, or the like, commands such as adjustment of a volume of a sound output from the audio output module, switch to a touch input mode of the display unit, and the like, may be received.

According to the embodiment of the present invention, the position of the downwardly moved status window 61 may be fixed through an input applied to the rear input module. Namely, referring to FIG. 33A, when only the first input T1 is received and the foregoing rear input is received, without the second input T2, the position of the status window 61 may be fixed to a position corresponding to the spot at which the rear input was received.

Meanwhile, the input pattern for fixing the status window 61 downwardly moved according to a downward drag input with respect to the indicator area 60 may be variously modified to be implemented.

Figure 34:
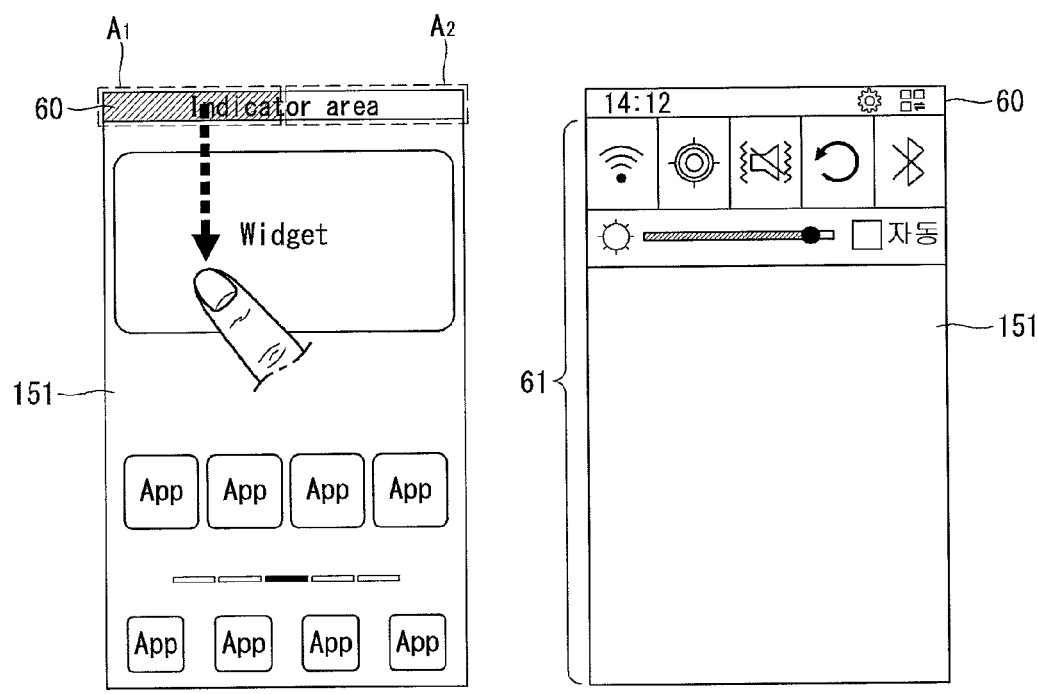
Figure 35:
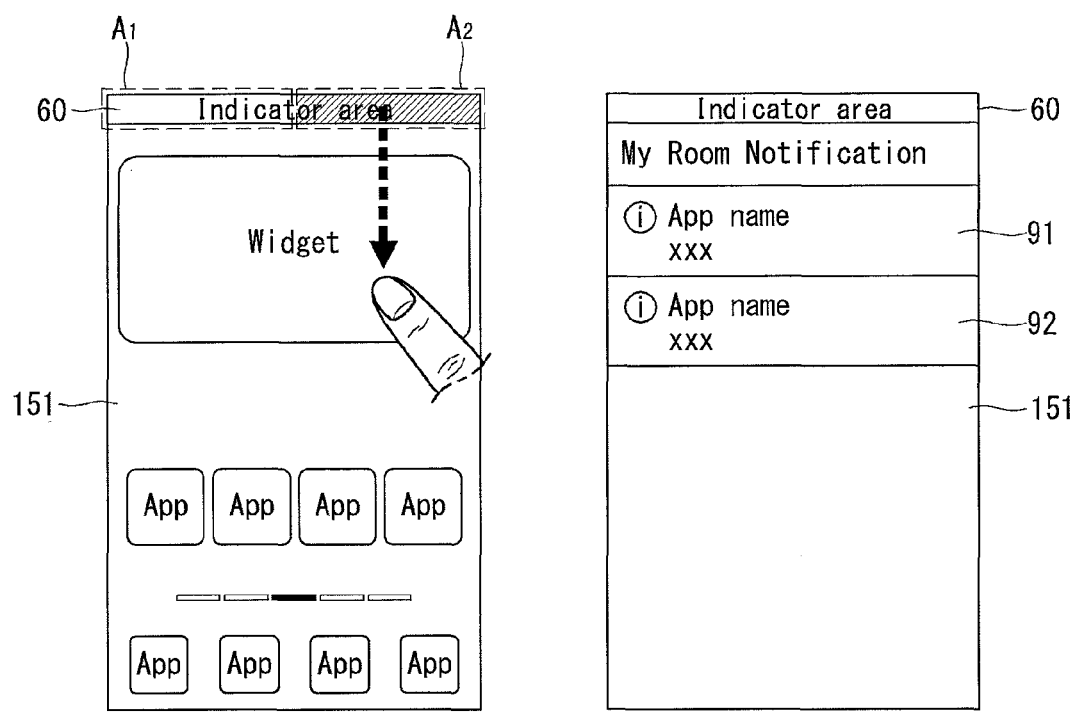
Figure 36:
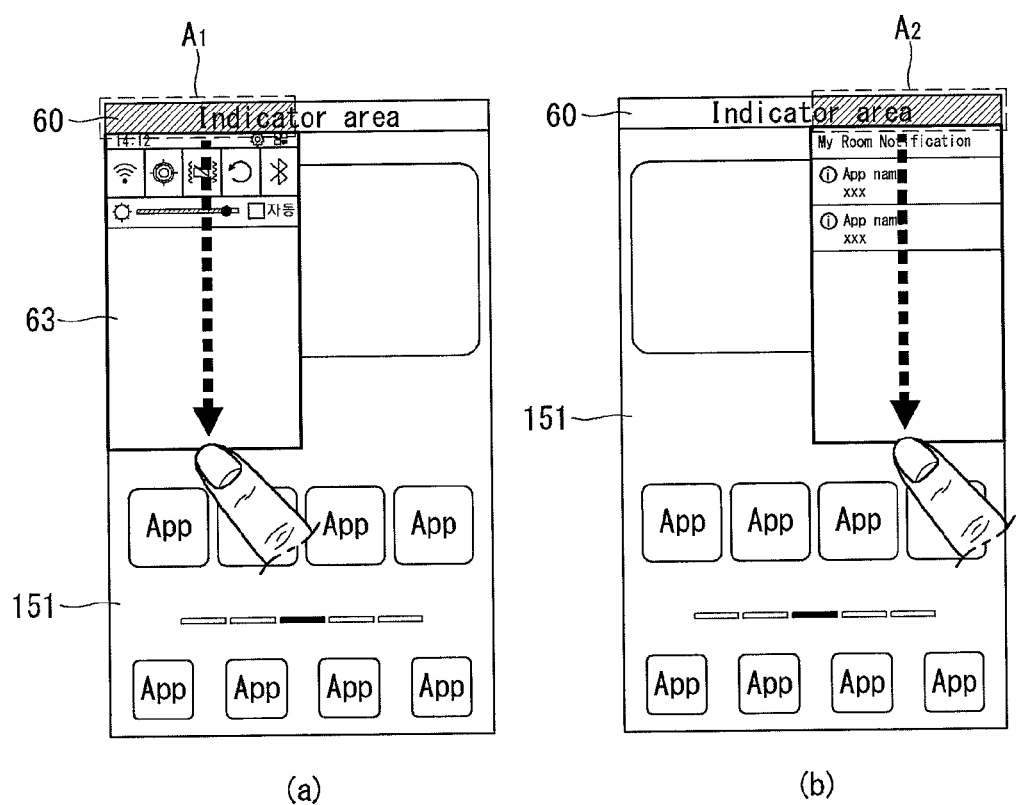

FIGS. 34 through 36 are views illustrating other examples of receiving notification information related to a secret folder by using an indicator area according to the embodiment of the present invention.

According to an embodiment of the present invention, the indicator area displayed in the upper end region of the touch screen 151 may be divided into at least two sections reflecting different attributes. For example, referring to FIG. 34, the indicator area may be divided into a first indicator area A1 and a second indicator area A2. The discrimination may not be visually displayed in a general situation, and for example, when a predetermined touch input applied to any one of the at least two or more regions is received, the corresponding area may be activated.

For example, referring to FIG. 34, when a long touch input applied to the first indicator area A1 is received, the controller 180 can display the first indicator area A1 such that it is visually discriminated from other regions. When a drag input extending the touch input applied to the first indicator area A1 downwards is received, the controller 180 can display status information of the mobile terminal corresponding to a first category on the touch screen 151.

Also, for example, referring to FIG. 35, when a long touch input applied to the second indicator area A2 is received, the controller 180 can display the second indicator area A2 such that it is discriminated from the first indicator area A1. When an input dragging the touch input applied to the second indicator area A2 downwards is received, the controller 180 can display status information of the mobile terminal corresponding to a second category different from the first category on the touch screen 151.

The foregoing status information of the mobile terminal may include notification information, and the first category may include general setting information related to the use of the mobile terminal, application update information, message reception information, and the like.

The second category may include notification information 91 and 92 related to at least one item included in the secret folder initiated according to the embodiment of the present invention. Namely, according to the embodiment of the present invention, the indicator area of the mobile terminal 100 may be divided into left and right areas based on the middle as a reference, and when the left indicator area slides, general status information of the mobile terminal may be initiated and when the right indicator area slides, the matters 91 and 92 related to the secret folder may be initiated.

In FIGS. 34 and 35, the status window slidably displayed according to the downward drag input applied to the first indicator area A1 or the second indicator area A2 may be displayed in the entire area of the touch screen 151.

Meanwhile, referring to FIGS. 36(*a*) and 36(*b*), a status window 63 slidably displayed according to a downward drag input applied to the first indicator area A1 may have a width corresponding to a horizontal length L4 of the first indicator area A1. This is the same to the second indicator area A2, and a status window 64 having a width corresponding to a horizontal length L5 of the second indicator area A2 may slide.

Status information of the mobile terminal corresponding to the first category as described above may be displayed in the status window 63 initiated according to manipulation of the first indicator area, and the foregoing second category (for example, notification information related to the secret folder) may be displayed in a status window 64 initiated according to manipulation of the second indicator area.

The status window corresponding to the horizontal length of the indicator area may be advantageously applied to a tablet PC having a large display, or the like.

Figure 37:
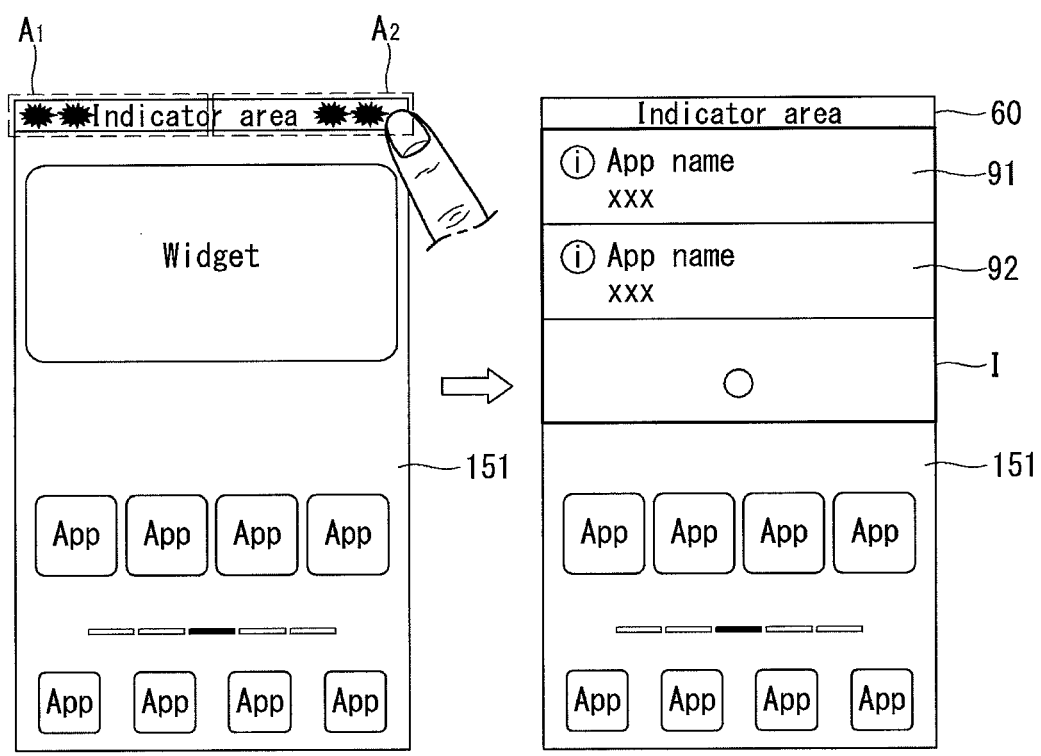

Referring to FIG. 37, the controller 180 can check notification information related to the secret folder by applying the code described above with reference to FIG. 9 to the indicator area. The code may be a series of code set in addition to a user signature to access the secret folder.

For example, the controller 180 can divide the indicator area into two areas A1 and A2, and when touch inputs corresponding to the number of set codes is dividedly received by the first indicator area A1 and the second indicator area A2, the controller 180 can display the notification information 91 and 92 related to the secret folder on the touch screen 151.

Figure 38:
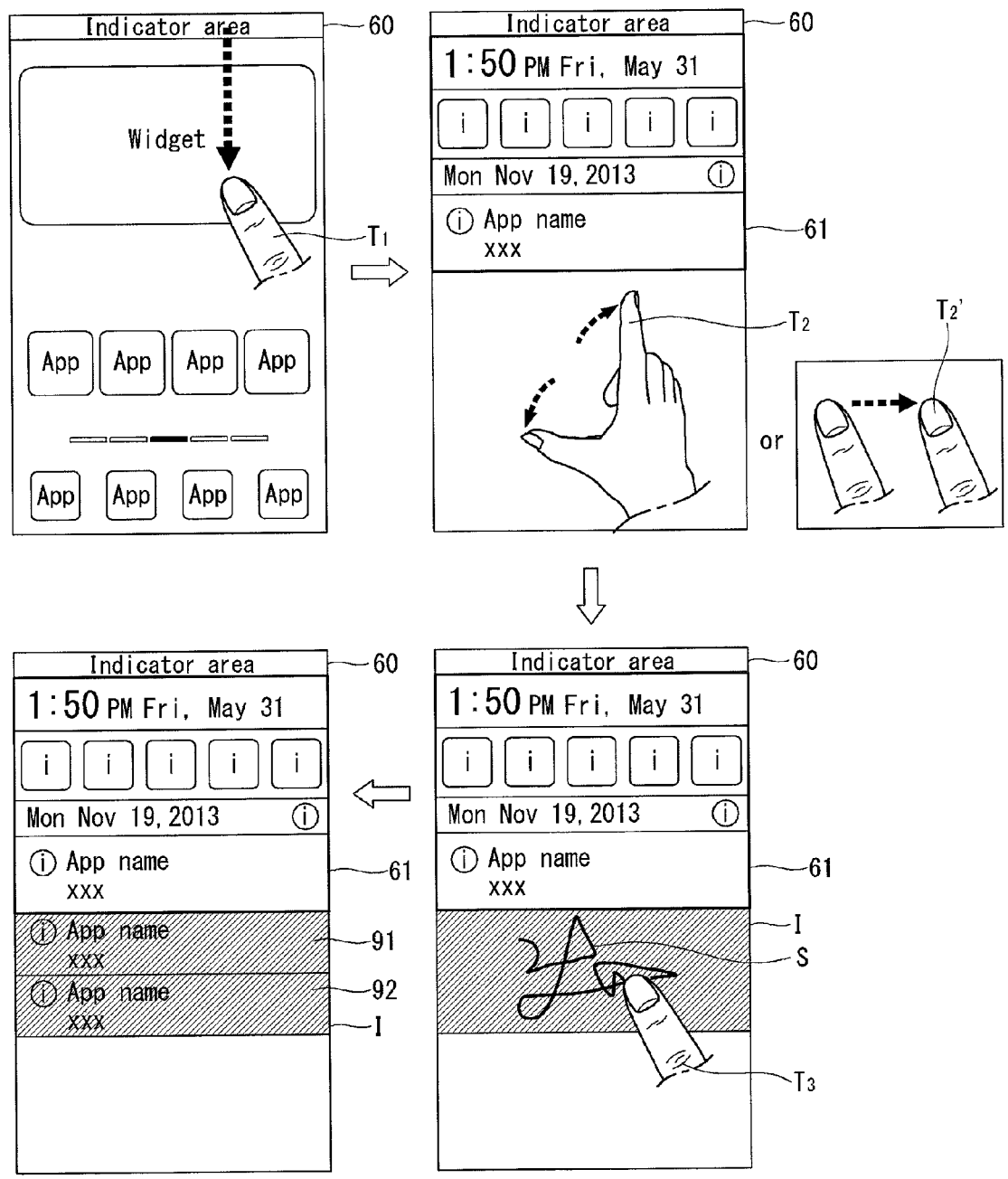
Figure 39:
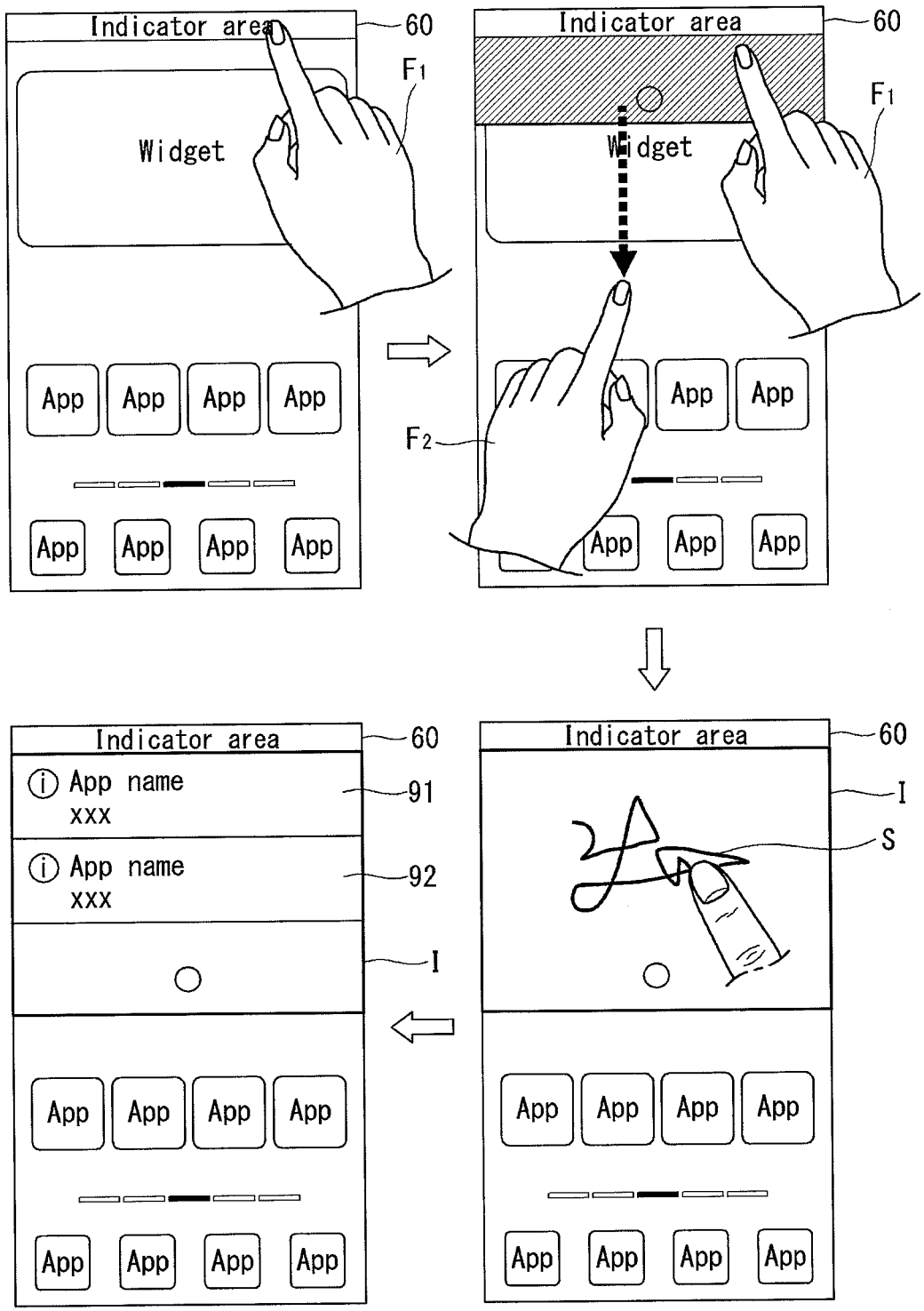

Referring to FIG. 38, when the input T1 of dragging the indicator area downwards is received, the controller 180 can slidably display the status window 61 on the touch screen 151. When the pinch-out input T2 applied to an empty space of the status window 61 is received, the controller 180 can activate and display the signature pad I within the status window 61. Meanwhile, the input for activating the signature pad I in the status window 61 may include a swipe input applied to the empty space, in addition to the pinch-out input T2. When a user signature S is input to the signature pad I, the notification information 91 and 92 related to the secret folder may be displayed in the signature pad I.

Meanwhile, in another example of activating the signature pad I in the status window 61, referring to FIG. 34, when the indicator area is touched with the first finger F1, when an input of dragging the indicator area downwards with the second finger F2 is received, the controller 180 can slidably display the signature pad I on the touch screen 151 according to the drag input. A follow-up process is the same as described above.

Figure 40:
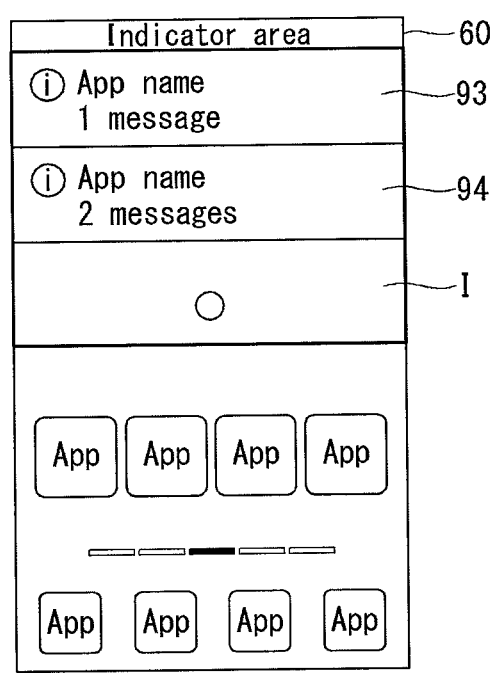
Figure 41:
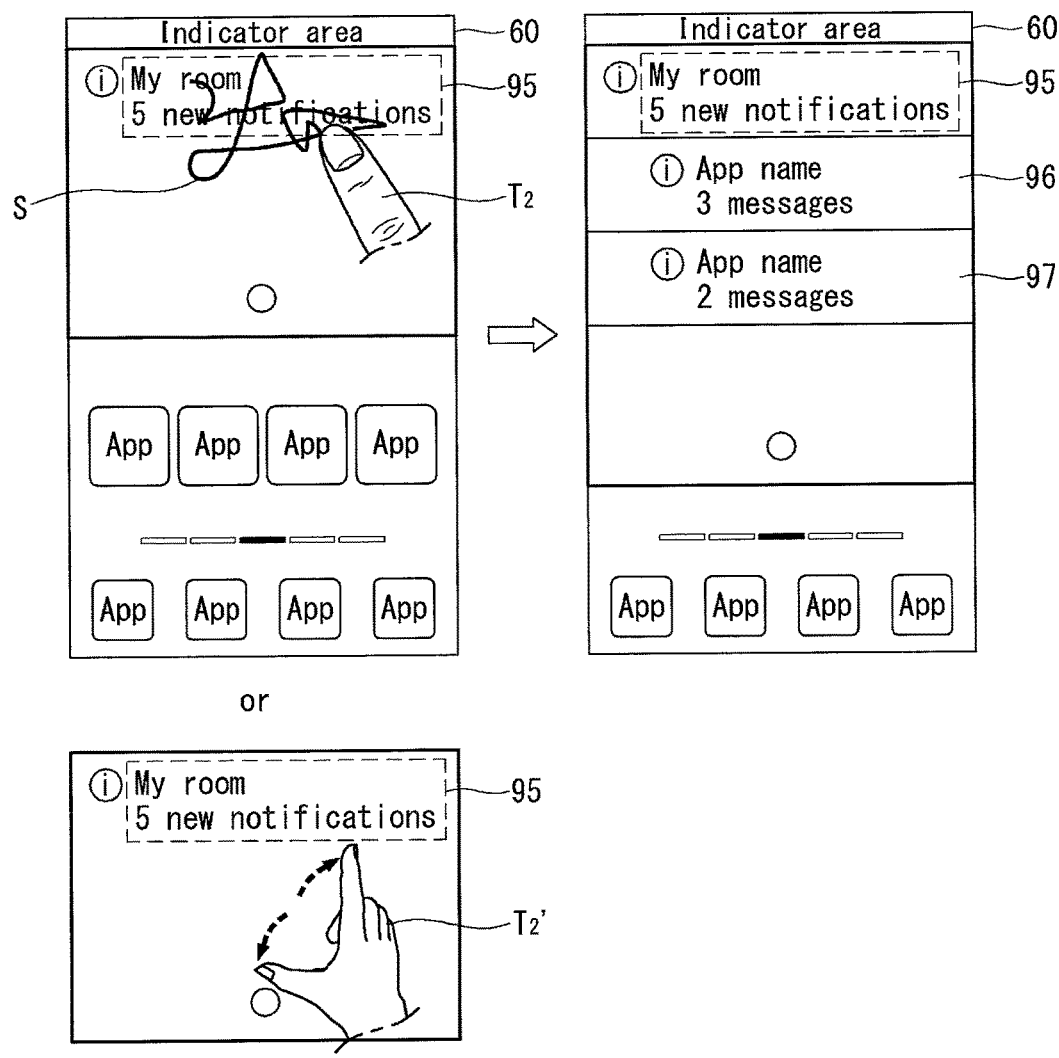

FIGS. 40 and 41 are views illustrating a type in which notification information related to a secret folder is displayed by utilizing an indicator area according to an embodiment of the present invention.

Referring to FIG. 40, when an application to be notified is a messenger, for example, the notification information 93 and 94 related to the secret folder, such as a name of a messenger application, a number of unread messages, or the like, may be schematically displayed.

Meanwhile, as illustrated in FIG. 41, when an input of dragging the indicator area downwards is received (including a drag input by a multi-touch), the controller 180 can integrate the number of notification information items related to the secret folder to display rough notification information 95. When a user signature is received or a pinch-out input is received with respect to the rough notification information 95, the controller 180 can display specific notification information 96 and 97 on the touch screen 151.

Figure 42:
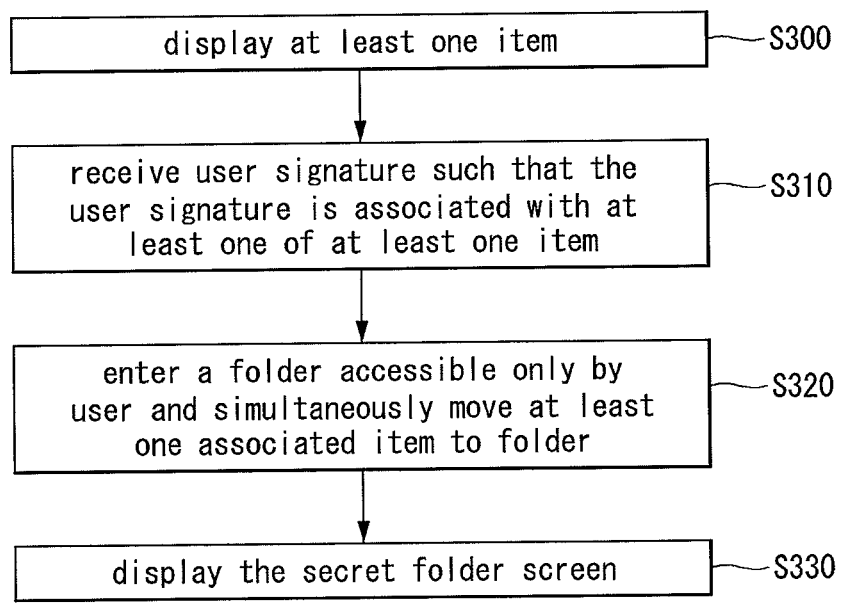
FIG. 42 is a flow chart illustrating a method for controlling a mobile terminal according to a third embodiment of the present invention.

FIG. 42 is a flow chart illustrating a method for controlling a mobile terminal according to a third embodiment of the present invention. The method for controlling a mobile terminal according to the third embodiment of the present invention may be implemented by the mobile terminal 100 described above with reference to FIGS. 1A through 1C. Also, the third embodiment may be implemented based on the first and/or second embodiment.

Referring to FIG. 42, the controller 180 can display at least one item on the touch screen 151 (S300). The at least one item may include at least one of an image, video, a document file, an audio record file, a memo file, and a music file.

The controller 180 can receive a user signature. In this instance, the controller 180 can receive a user signature such that it is associated with at least one of the at least one displayed item (S310).

The association of the user signature to the at least one item may be an association operation for moving the associated item to the secret folder. For example, after an input for selecting at least one of the at least one item displayed on the touch screen 151 is received, a user signature may be received.

Also, for example, when the at least one item is displayed on the touch screen 151, the mode for receiving a user signature according to the embodiment of the present invention may be entered. In this state, if at least a portion of a trace of an input user signature overlaps, the controller 180 can determine that the overlapping item is associated with the user signature.

The controller 180 can move the at least one associated item to the secret folder immediately when the user-only accessible secret folder is entered (S320). Accordingly, the controller 180 can display the secret folder screen including the at least one item associated with the user signature on the touch screen 151 (S330).

Hereinafter, an example in which the secret folder is entered by using the user signature applied to the embodiment of the present invention and predetermined content is simultaneously moved to the secret folder will be described with reference to relevant drawings.

Figure 43:
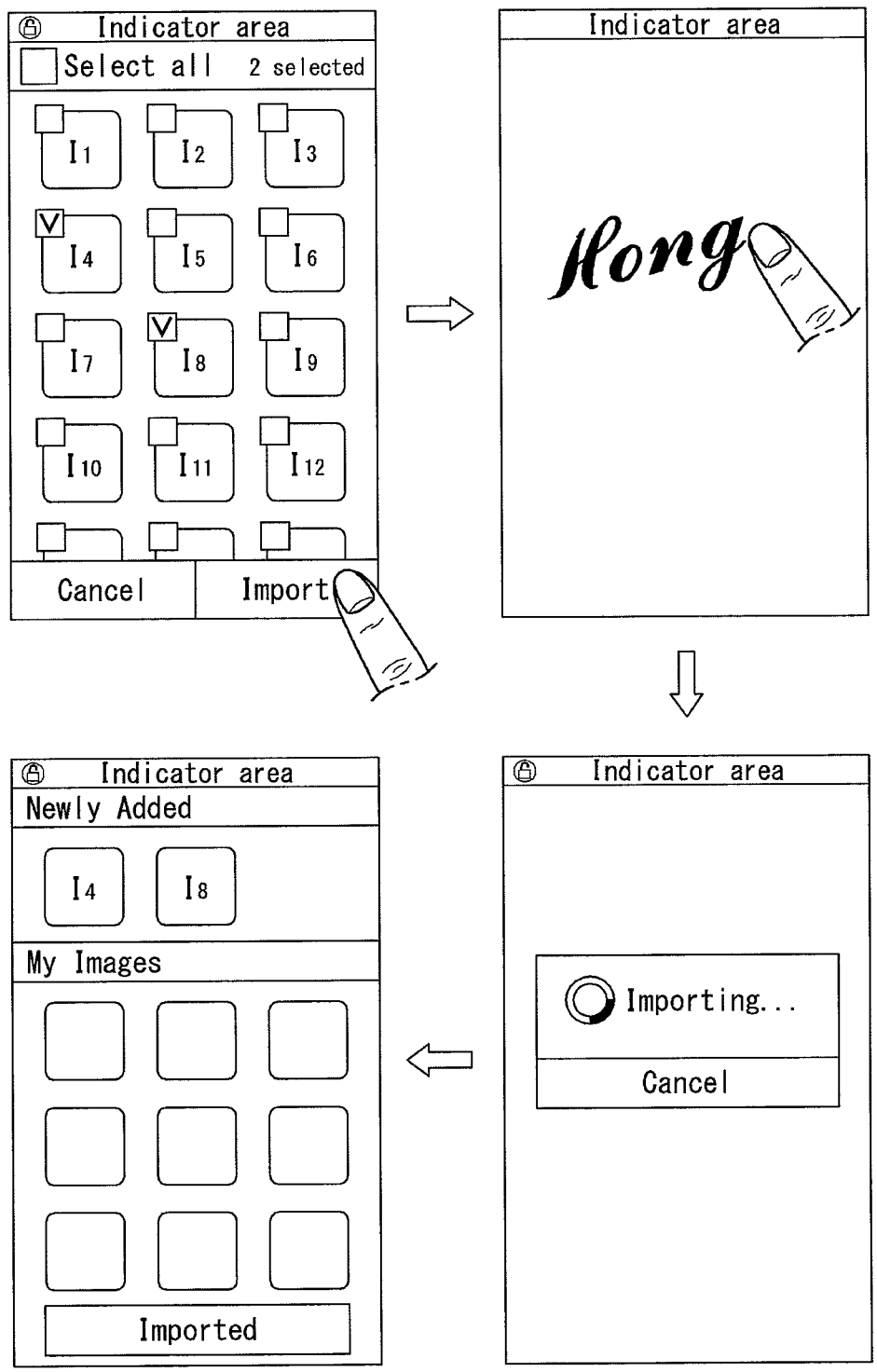
FIGS. 43 and 44 are views illustrating examples of moving a predetermined item to a user-only accessible folder or deleting an item existing in the folder through a user signature according to the third embodiment of the present invention.
Figure 44:
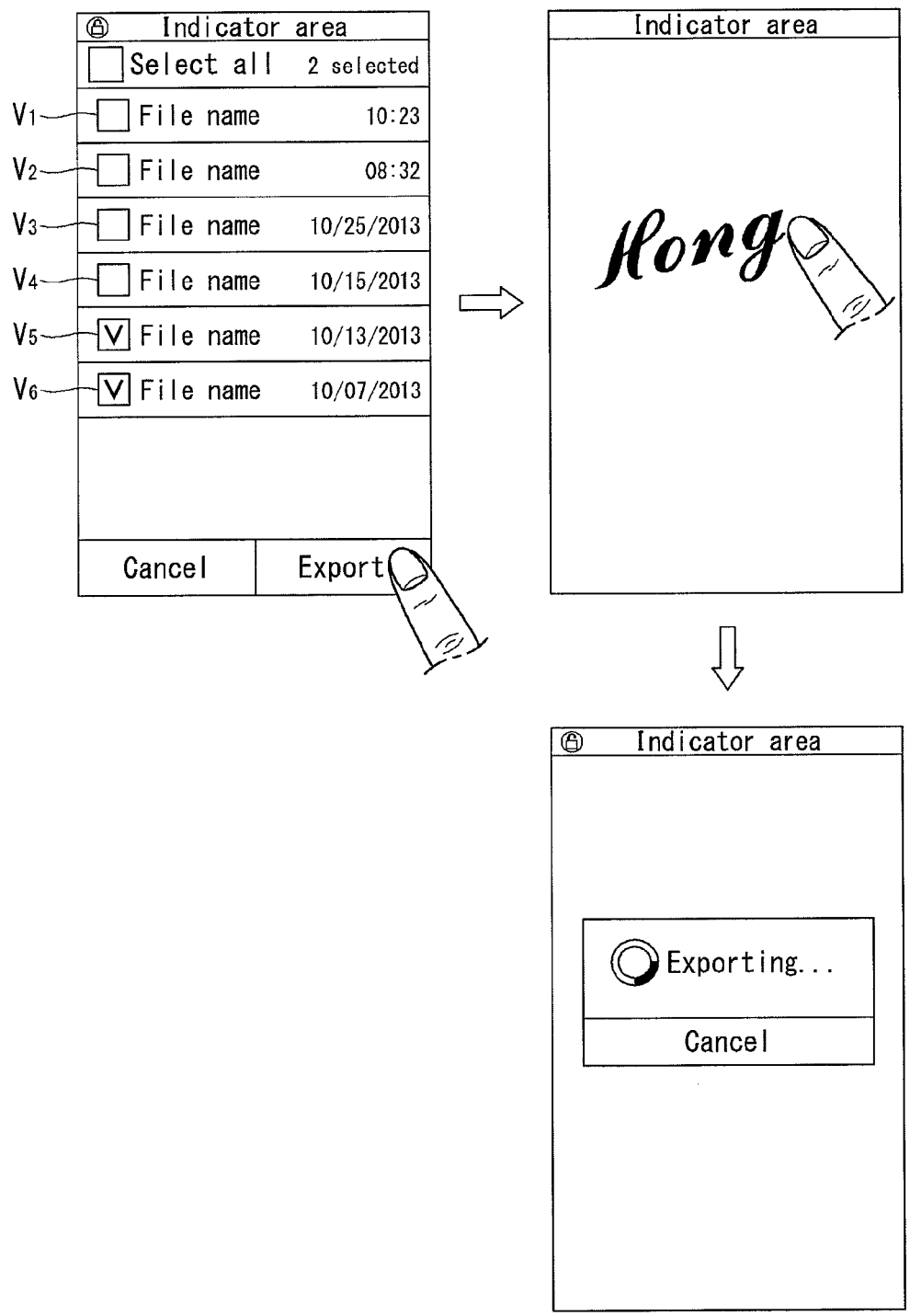

FIGS. 43 and 44 are views illustrating examples of moving a predetermined item to a user-only accessible folder or deleting an item existing in the folder through a user signature. Referring to FIG. 43, the controller 180 can display a menu (import) for moving predetermined content to the secret folder together with at least one content on the touch screen 151.

When an input for selecting at least one (I4 and I8) from among at least one content I1, I2, I3, I4, I5, I6, I7, I8, I9, I10, I11, and I12 displayed on the touch screen 151 is received and the menu is selected, an area for receiving a user signature may be activated. When a user signature is input, the controller 180 can move the selected content I4 and I8 to secret folder and display a secret folder screen including the selected content I4 and I8 on the touch screen 151.

Referring to FIG. 44, at least one content included in the secret folder may be deleted from the secret folder. Also, In this instance, a user signature may be required. This is to prevent an unauthorized deletion by a third party.

Referring to FIG. 44, the controller 180 can display a list including at least one audio record file V1, V2, V3, V4, V5, and V6 stored in the secret folder on the touch screen 151. When an input for selecting at least one audio record file (V5 and V6) to be deleted from the list is received and a menu (Export) for sending content stored in the secret folder to the outside is selected, the controller 180 can activate an area for receiving a user signature. When a user signature is input, the controller 180 can send the selected audio record files V5 and V6 to the outside. The externally sent content may be moved to a general content storage folder.

Figure 45:
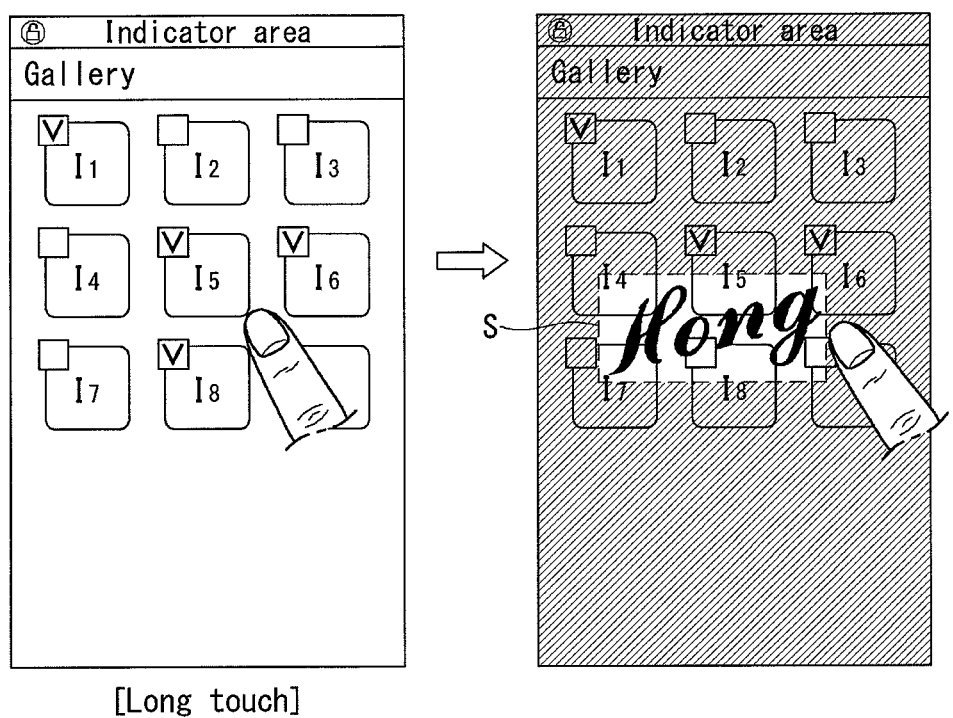
FIGS. 45 through 47 are views illustrating other examples of moving a predetermined item to a folder accessible only by a user through a user signature according to the third embodiment of the present invention.
Figure 46:
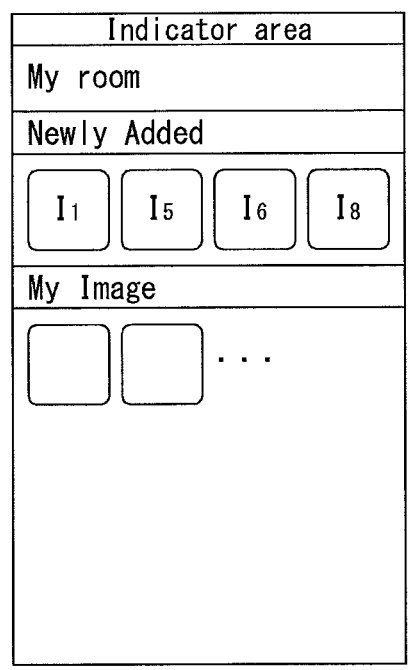
Figure 47:
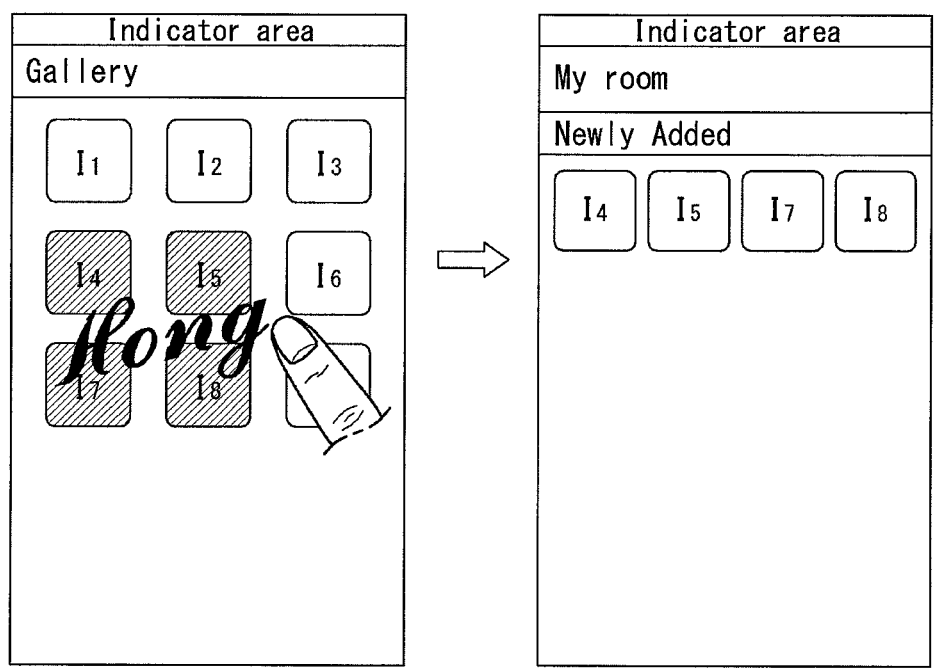

FIGS. 45 through 47 are views illustrating other examples of moving a predetermined item to a folder accessible only by a user through a user signature. Referring to FIGS. 45 and 47, When an when an input for selecting at least one I1, I8, I6, and I8 of at least one content I1, I2, I3, I4, I5, I6, I7, I8, and I9 displayed on the touch screen 151 is received and a predetermined input (for example, a long touch input) applied to an empty space of the touch screen 151 is received, the controller 180 can display the area for receiving a user signature such that it overlaps with at least one of the displayed contents I1, I2, I3, I4, I5, I6, I7, I8, and I9.

When the area for receiving a user signature is activated, the other regions of the touch screen 151 may be deactivated. When a user signature is input, the controller 180 can enter the secret folder and move the at least one selected content I1, I8, I6, and I8 to the secret folder to display the same.

Referring to FIG. 47, when the at least one content I1, I2, I3, I4, I5, I6, I7, I8, and I9 is displayed on the touch screen 151, the area for receiving a user signature may be activated by a predetermined input and a user signature may be subsequently received. As the user signature is input, the controller 180 can simultaneously enter the secret folder and move at least one content I4, I5, I6, and I7 overlapping with at least a portion of traces corresponding to the input user signature to the secret folder and display the same.

Figure 48:
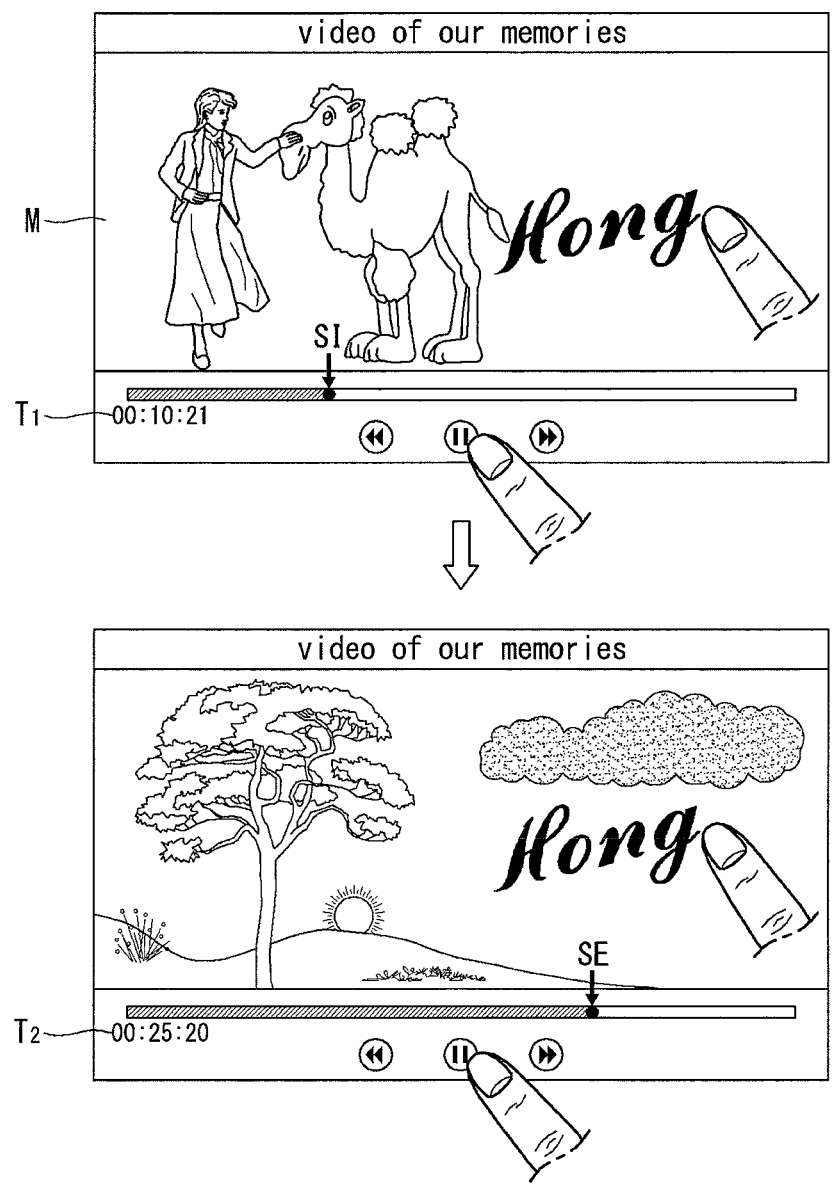
FIGS. 48 and 49 are views illustrating examples of moving at least a portion of content to a user-only accessible folder through a user signature according to the third embodiment of the present invention.
Figure 49:
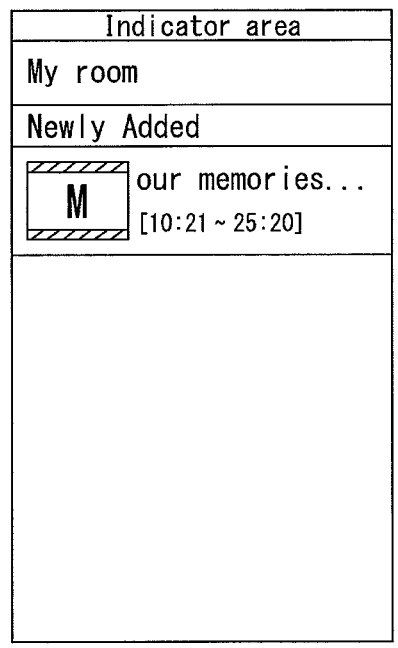

FIGS. 48 and 49 are views illustrating examples of moving at least a portion of content to a user-only accessible folder through a user signature. While video content is being played, the controller 180 can edit only a particular section of the video content by using a user signature. Also, when the editing is completed, the controller 180 can enter the secret folder and provide control to store the edited video in the secret folder.

For example, referring to FIG. 48, while video content M is being played, when the video content is temporarily stopped at a point of time T1 (00:10:21), the controller 180 can activate an area for receiving a user signature on the stopped screen and receive a user signature. Also, after the point in time T1, a play function may be executed to play the video content M. In this instance, when the video content M is temporarily stopped at a point in time T2 (00:25:20), the controller 180 can activate an area for receiving a user signature on the stopped screen and receive a user signature again.

The controller 180 can separately extract a video corresponding to a section from the point in time T1 to the point in time T2 and edit the same as separate video content. Thereafter, when a user signature is input after the point in time T2, the controller 180 can enter the secret folder and store the edited video in the secret folder.

Meanwhile, an indicator SI corresponding to the point in time T1 may be displayed on a progress bar controlling playing of video content, and an indicator SE corresponding to the point in time T2 may be displayed on the progress bar.

Referring to FIG. 49, the controller 180 can add the video edited in FIG. 48 to the secret folder. The added item may be displayed together with section information such that the video corresponding to the particular section (10:21~25:20) has been edited and added may be recognized.

Figure 50:
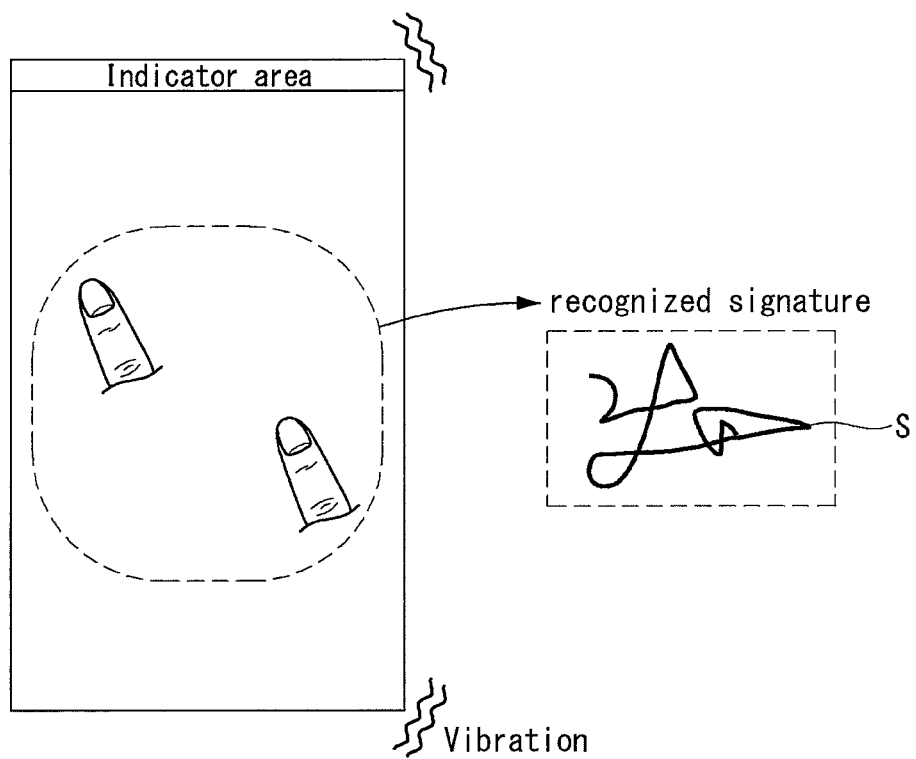
FIGS. 50 through 52 are views illustrating examples of enhancing security by controlling display of a user signature input to enter a secret folder according to an embodiment of the present invention.

Referring to FIG. 50, the controller 180 can conceal a trace of an input user signature. For example, the controller 180 cannot display an input user signature in real time, and when the input of user signature is completed, the controller 180 can generate a predetermined haptic reaction to notify the user that the user signature has been normally input.

Figure 51:
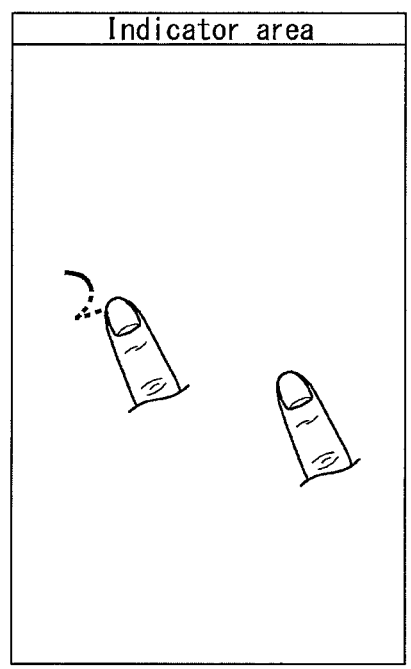
Figure 51:
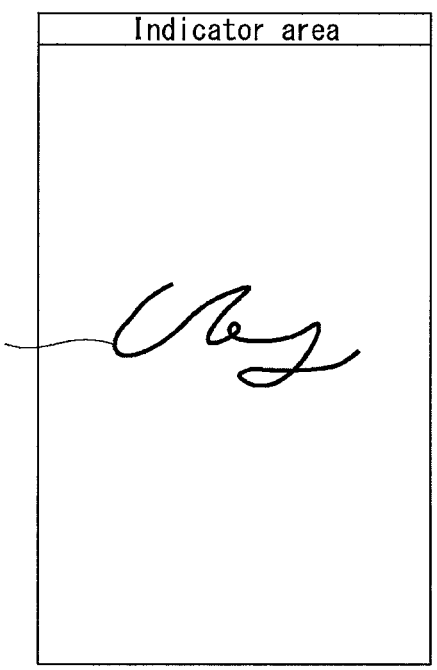

Referring to FIG. 51, the controller 180 can display at least only a portion of a trace of an input user signature to prevent exposure of the pattern of the user signature to a third party. For example, the controller 180 can display the corresponding trace only for a predetermined time (for example, 0.01 seconds), starting from a point in time at which a user signature is input.

When a touch for inputting the user signature is released, the controller 180 can display a trace of a pattern other than a signature of a previously registered pattern. Meanwhile, even though a pattern of a previously registered user signature is input, the controller 180 can display a pattern other than the pattern of the previously registered user signature in real time.

Figure 52:
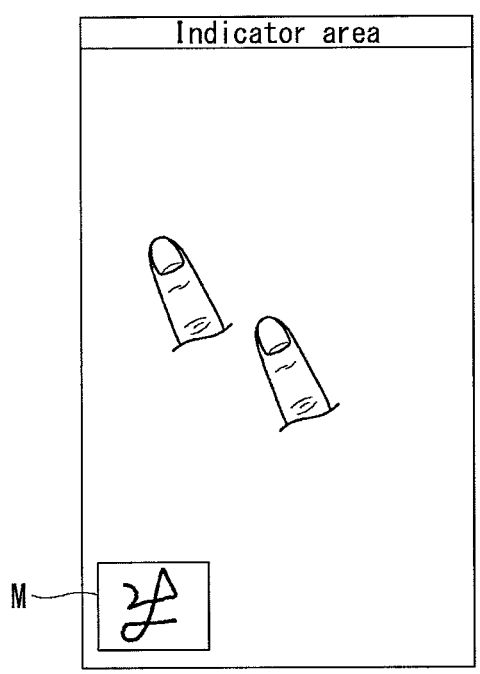

Referring to FIG. 52, the controller 180 cannot display a trace of a user signature at a spot where the user signature is input in real time, but display an input trace in the form of a mini-view M in a small screen. Accordingly, although an input user signature is not displayed in real time, the user may check whether a proper signature is input through the mini-view In the above, the feedback method for strengthening security in relation to a user signature has been described, but the present invention is not limited thereto an variously modified feedback may be provided.

Meanwhile, according to an embodiment of the present invention, if a user signature is erroneously input, the user may be requested to input again the user signature through predetermined feedback. For example, information indicating an input user signature is not proper may be provided to the user by generating vibration of a predetermined pattern or through an audio effect, a visual effect, or the like.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:
1. A mobile terminal comprising:
a wireless communication unit configured to provide wireless communication;
a touch screen; and
a controller configured to:

display a lock mode screen on the touch screen when the mobile terminal is in a locked state, wherein the lock mode screen does not react to a touch input other than a user's touch input for releasing the lock state, activate and display a region for receiving a user signature on the touch screen in response to a predetermined touch input on the lock mode screen, receive a user signature that identifies a user and has a predetermined trace on the activated region while the mobile terminal is in a locked state, and release the locked state and allow entry to a user-only accessible folder based on the received user signature when the received user signature corresponds to a registered user signature.

2. The mobile terminal of claim 1, wherein the controller is further configured to:

display a sub region on the touch screen in which a flicking input does not scroll information included in the sub region, receive a flicking input in the sub region, and activate the sub region for receiving the user signature based on the received flicking input.

3. The mobile terminal of claim 1, wherein the predetermined input includes a stroke input applied to at least a portion of a body of the mobile terminal to generate a predetermined vibration in the mobile terminal.

4. The mobile terminal of claim 1, wherein controller is further configured to:

display a background screen on the touch screen, receive a pinch-out input applied to the touch screen as the predetermined touch input, and display an area for receiving the user signature on the background screen.

5. The mobile terminal of claim 1, wherein the predetermined input includes a touch input starting from a bezel and extending to the touch screen.

6. The mobile terminal of claim 1, wherein the predetermined trace corresponding to the user signature is performed directly on the folder.

7. The mobile terminal of claim 1, wherein the predetermined input includes a touch input of dragging an indicator area of the touch screen downwards by a multi-touch, and wherein the controller is further configured to activate an area for receiving the user signature in the slid indicator area.

8. The mobile terminal of claim 1, wherein the controller is further configured to:

turn power off to the touch screen, and when a touch input is maintained at a spot where the trace according to the user signature is terminated for a predetermined period of time, turn on the power to the touch screen and enter the folder.

9. The mobile terminal of claim 1, wherein the controller is further configured to:

display the folder to have first items when the user signature is traced with one finger, and display the folder to have second items which is a restricted subset of the first items, when the user signature is traced using a stylus pen or a multi-touch input.

10. The mobile terminal of claim 1, wherein the controller is further configured to:

receive a tag trace in addition to the user signature, and display the folder with at least one filtered item filtered by the tag.

11. The mobile terminal of claim 1, wherein the controller is further configured to:

receive a predetermined drag input with respect to an indicator area of the touch screen, activate an area for receiving the user signature in the slid indicator area, and display notification information related to items included in the folder on the slid indicator area.

12. The mobile terminal of claim 1, wherein the controller is further configured to:

receive an input for associating at least one item displayed on the touch screen to the user signature, and move the at least one item associated with the user signature to the folder.

13. The mobile terminal of claim 1, wherein the controller is further configured to:

display an identifier in an indicator area of the touch screen indicating a state of entering the folder.

14. The mobile terminal of claim 1, wherein the controller is further configured to:

pair the mobile terminal with a wearable device worn by the user, receive at least one personal information included in the wearable device through the wireless communication unit, and display the at least one personal information with contents included in the entered folder.

15. The mobile terminal of claim 1, wherein the lock mode screen include a pattern guide for inputting of a pattern password, and wherein the controller is configured to activate and display the region before displaying the pattern guide.

16. The mobile terminal of claim 15, wherein the predetermined touch input is a flicking input rather than a touch input applied to a plurality of objects constituting the pattern guide.

17. The mobile terminal of claim 1, wherein the predetermined touch input is a long touch input applied to an empty space of the lock mode screen.

18. A method of controlling a mobile terminal, the method comprising:

registering a user signature that identifies a user and has a predetermined trace;

displaying a lock mode screen on the screen when the mobile terminal is in a locked state, wherein the lock mode screen does not react to a touch input other than a user's touch input for releasing the lock state;

activating and displaying a region for receiving, via a controller of the mobile terminal, the user signature in response to a predetermined touch input on the lock mode screen;

receiving the user signature on the activated region while the mobile terminal is in the lock state; and releasing the locked state and allowing entry to a user-only accessible folder when the received user signature is matched with the registered user signature.

19. The method of claim 18, further comprising:

displaying a sub region on the touch screen in which a flicking input does not scroll information included in the sub region;

receiving a flicking input in the sub region; and activating the sub region for receiving the user signature based on the received flicking input.

* * * * *